(12) United States Patent
Romano et al.

(10) Patent No.: US 11,719,301 B2
(45) Date of Patent: Aug. 8, 2023

(54) FLUIDIC FLEXIBLE MATRIX COMPOSITE (FFMC) TUBE VIBRATION CONTROL SYSTEM

(71) Applicant: BELL TEXTRON INC., Fort Worth, TX (US)

(72) Inventors: Peter Quinn Romano, Fort Worth, TX (US); Michael S. Seifert, Southlake, TX (US); Jeffrey M. Bosworth, Argyle, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 1327 days.

(21) Appl. No.: 16/399,458

(22) Filed: Apr. 30, 2019

(65) Prior Publication Data

US 2020/0347903 A1 Nov. 5, 2020

(51) Int. Cl.
*F16F 7/10* (2006.01)
*B64C 17/00* (2006.01)

(52) U.S. Cl.
CPC ............ *F16F 7/1034* (2013.01); *B64C 17/00* (2013.01); *F16F 7/10* (2013.01); *F16F 7/1017* (2013.01); *F16F 2222/08* (2013.01); *F16F 2228/066* (2013.01); *F16F 2230/18* (2013.01); *F16F 2236/08* (2013.01)

(58) Field of Classification Search
CPC .......... F16F 7/1034; F16F 7/10; F16F 7/1017; F16F 2222/08; F16F 2228/066; F16F 2230/18; F16F 2236/08; F16F 15/02; B64C 17/00
See application file for complete search history.

(56) References Cited

U.S. PATENT DOCUMENTS 989,958 A 4/1911 Frahm
6,954,686 B2 10/2005 Aubourg et al.
(Continued)

OTHER PUBLICATIONS

Krott, Matthew, Edward Smith, and Christopher D. Rahn, "Experimental Validation of Multi-Mode Tailboom Passive Vibration Control Using Fluidic Flexible Matrix Composite Tubes," Annual Forum Proceedings-AHS International. American Helicopter Society, 2017, 11 pages.
(Continued)

*Primary Examiner* — Thomas W Irvin
(74) *Attorney, Agent, or Firm* — Akona IP

(57) ABSTRACT

An aircraft comprises an aircraft component, a sensor, and a multiple frequency vibration absorber (absorber). The sensor is operable to detect a frequency of a vibration of the aircraft component. The absorber is coupled to the aircraft component and configured to absorb the vibration. The absorber comprises a beam element, a fluidic flexible matrix composite (FFMC) tube, a valve, and a controller. The beam element is attached to the aircraft component. The fluidic flexible matrix composite (FFMC) tube is coupled to the beam element and is operable to absorb the vibration based on a stiffness of the FFMC tube. The valve is fluidically coupled to the FFMC tube and is to control the stiffness of the FFMC tube based on regulating a flow of a liquid through the FFMC tube. The controller can actively control absorption of the vibration via the FFMC tube based on opening and/or closing the valve.

19 Claims, 21 Drawing Sheets

(56) References Cited

U.S. PATENT DOCUMENTS

| | | | | |
|---|---|---|---|---|
| 7,617,874 | B2 | 11/2009 | Ocalan | |
| 8,499,907 | B2* | 8/2013 | Smith | F16F 7/108 |
| | | | | 188/316 |
| 9,745,055 | B2* | 8/2017 | Heverly, II | F16F 9/504 |
| 9,771,150 | B2* | 9/2017 | Smith | F16F 15/005 |
| 10,113,537 | B2* | 10/2018 | Tonazzini | B22D 30/00 |
| 2006/0151272 | A1* | 7/2006 | Smith | F16F 13/26 |
| | | | | 267/64.11 |
| 2007/0001052 | A1* | 1/2007 | Strehlow | F16F 15/02 |
| | | | | 244/99.1 |
| 2008/0173754 | A1* | 7/2008 | Strehlow | B64C 27/001 |
| | | | | 244/17.13 |
| 2016/0280363 | A1* | 9/2016 | Heverly, II | B64C 27/001 |
| 2021/0403148 | A1* | 12/2021 | Stamps | F16F 15/023 |

OTHER PUBLICATIONS

Miura, K, Krott, M.J., Smith, E.C., and Rahn, C.D., "Experimental Demonstration of a Vibration Absorber Using Braid-Sheathed Fluidic Flexible Matrix Composite Tubes," The Pennsylvania State University, date unknown, 22 pages.

Miura, K, Smith, E.C., and Rahn, C.D., "Modeling and Design of a Tailboom Vibration Absorber Using Fluidic Flexible Matrix Composite Tubes," Journal of the American Helicopter Society, vol. 62 Issue 4, Oct. 2017, 12 pages.

Miura, K., "Modeling, Design, and Experimental Validation of a Tailboom Vibration Absorber Using Fluidic Flexible Matrix Composite Tubes," A Dissertation in Mechanical Engineering, The Pennsylvania State University, Department of Mechanical and Nuclear Engineering, May 2016, 208 pages; https://www.mne.psu.edu/mrl/theses/KMiura%20dissertation%20final.pdf.

Shan, Ying, et al. "Fluidic flexible matrix composites for autonomous structural tailoring," Active and Passive Smart Structures and Integrated Systems 2007, vol. 6525, International Society for Optics and Photonics, 2007, 20 pages; https://apps.dtic.mil/dtic/tr/fulltext/u2/a488029.pdf.

* cited by examiner

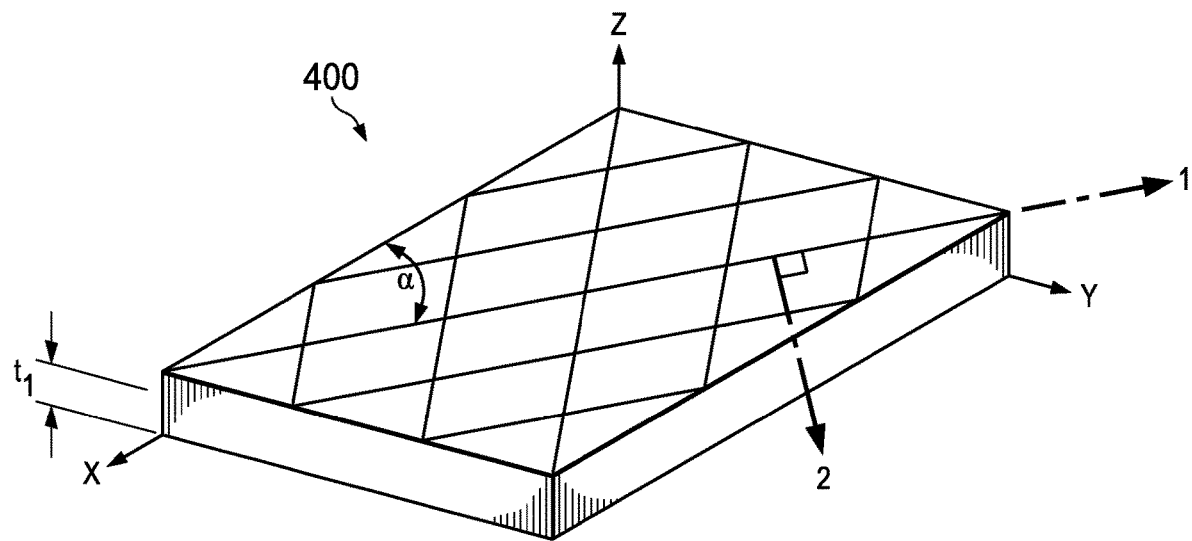
FIG. 4
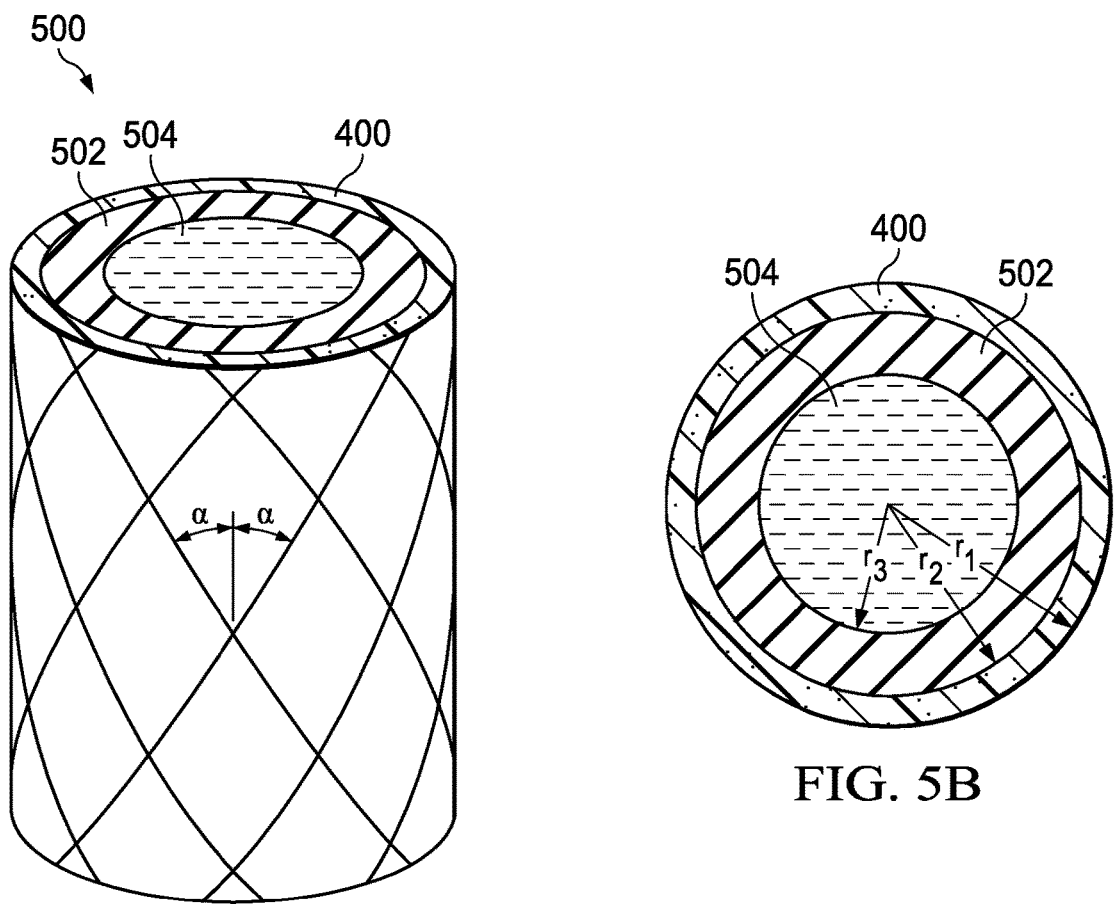
FIG. 5A
FIG. 5B

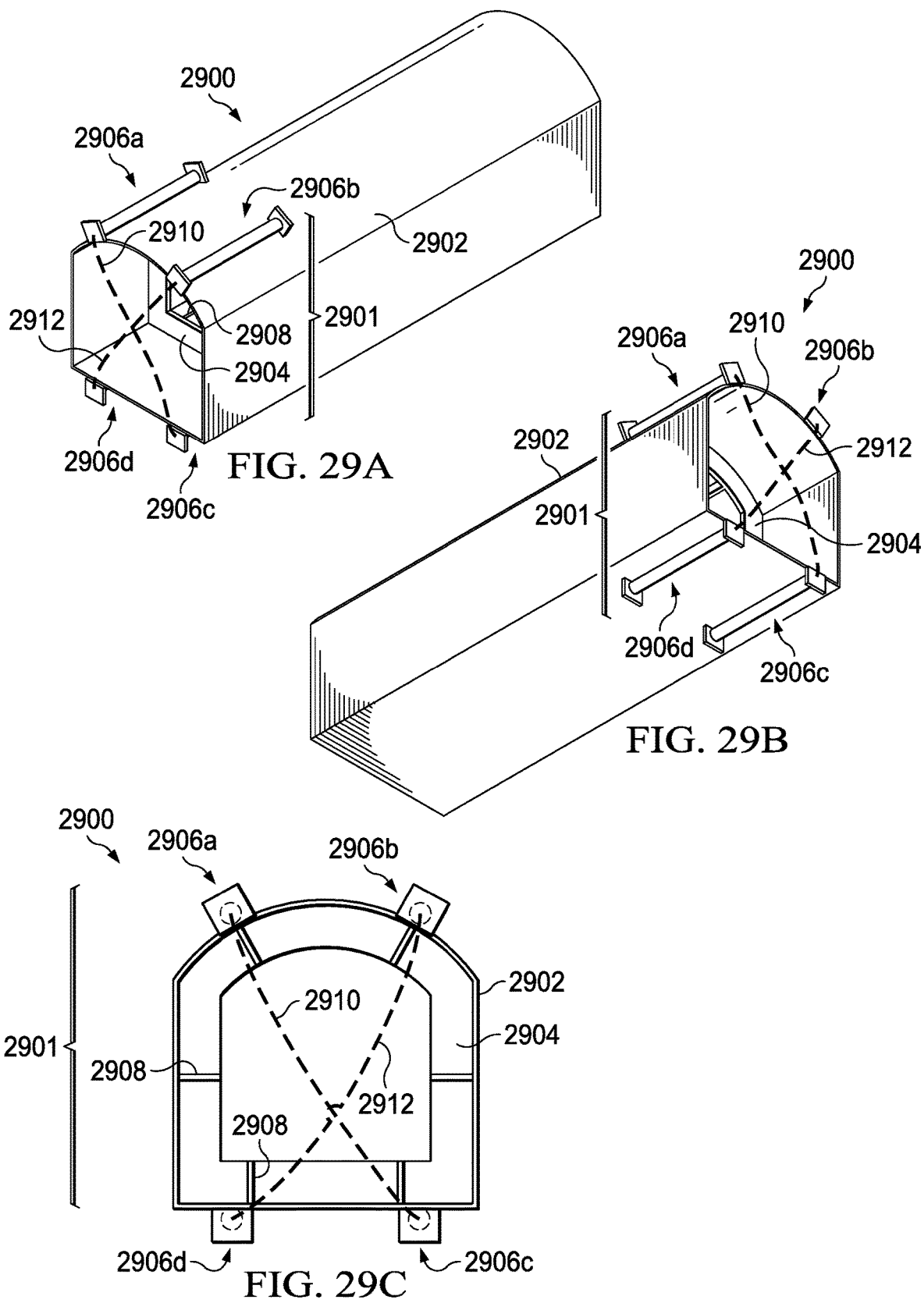

FLUIDIC FLEXIBLE MATRIX COMPOSITE (FFMC) TUBE VIBRATION CONTROL SYSTEM

TECHNICAL FIELD

This disclosure relates generally to aircraft, and more particularly, though not exclusively, to systems and apparatuses for controlling vibrations of various components of an aircraft using fluidic flexible matrix composite tubes.

BACKGROUND

Aircraft include mechanical components that produce vibrations during operation. In addition, when airborne, airflow around various parts can induce further vibrations that may exacerbate the vibrations from the mechanical components. One approach to mitigating vibrations is to include additional structural members such as ribs, stiffeners, spars, and the like to increase stiffness of the mechanical components to a level that damps such vibrations by an acceptable level. However, adding more structural members can increase the complexity and the weight of such a mechanical component.

SUMMARY

In some examples, an aircraft component comprises a composite material and a fluidic flexible matrix composite (FFMC) tube. The composite material comprises a plurality of layers, and a cavity disposed within the plurality of layers. The FFMC tube occupies the cavity. The FFMC tube is configured to isolate vibration of the aircraft component based on the combined stiffness of the FFMC tube and mechanical structure.

In further examples, a vibration damping system comprises an aerodynamic aircraft member comprising an outer surface and fluidic flexible matrix composite (FFMC) tubes coupled to the outer surface. A cross section of the aerodynamic aircraft member comprises quadrants. The FFMC tubes are coupled to the outer surface and configured to damp a torsional vibration of the aerodynamic aircraft member based on the FFMC tubes being fluidically coupled to one another and positioned in different ones of the quadrants that are located diagonal to one another.

In still further examples, an aircraft comprises an aircraft component, a sensor, and a multiple frequency vibration absorber. The sensor is operable to detect a frequency of a vibration of the aircraft component. The multiple frequency vibration absorber is coupled to the aircraft component and configured to absorb the vibration. The multiple frequency vibration absorber comprises: a beam element attached to the aircraft component, a fluidic flexible matrix composite (FFMC) tube coupled to the beam element, a valve fluidically coupled to the FFMC tube, and a controller. The FFMC tube is configured add and/or remove stiffness from the multiple frequency vibration absorber in order for the multiple frequency vibration absorber to isolate vibration at multiple frequencies. The valve is to control the stiffness of the FFMC tube based on regulating a flow of a liquid through the FFMC tube. The controller is to actively control isolation frequency of the mechanical system via the stiffness of the FFMC tube based on the valve being, e.g., open or closed. The controller is configured to open the valve to decrease the stiffness of the FFMC tube based on the sensor detecting that the vibration is in a first frequency range and close the valve to increase the stiffness of the FFMC tube based on the sensor detecting that the vibration is in a second frequency range.

BRIEF DESCRIPTION OF THE DRAWINGS

FIG. 4 illustrates a portion of an anisotropic flexible matrix composite material, in accordance with some embodiments of the present disclosure.

FIGS. 5A, 5B, 6, 7A, 7B, and 7C illustrate various details of fluidic flexible matrix composite (FFMC) tubes, in accordance with some embodiments of the present disclosure.

FIGS. 29A, 29B, 29C, 30A, 30B, 31A, 31B, 32A, and 32B illustrate details of vibration control systems that utilize FFMC tubes to damp vibration of an aircraft empennage.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Example embodiments that may be used to implement the features and functionality of this disclosure will now be described with more particular reference to the attached Figures.

Figure 1A:
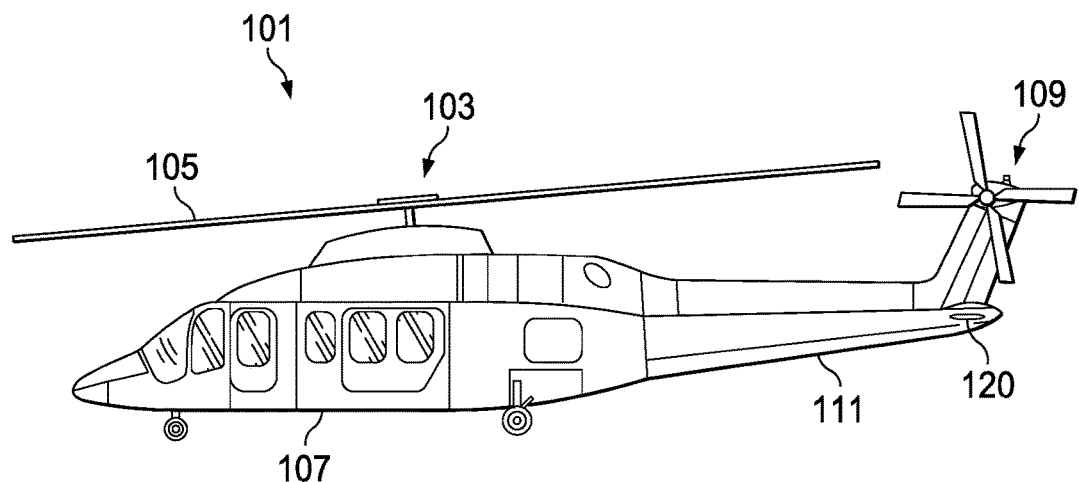
FIGS. 1A, 1B, 2, and 3 illustrate example aircraft, in accordance with some embodiments of the present disclosure.
Figure 1B:
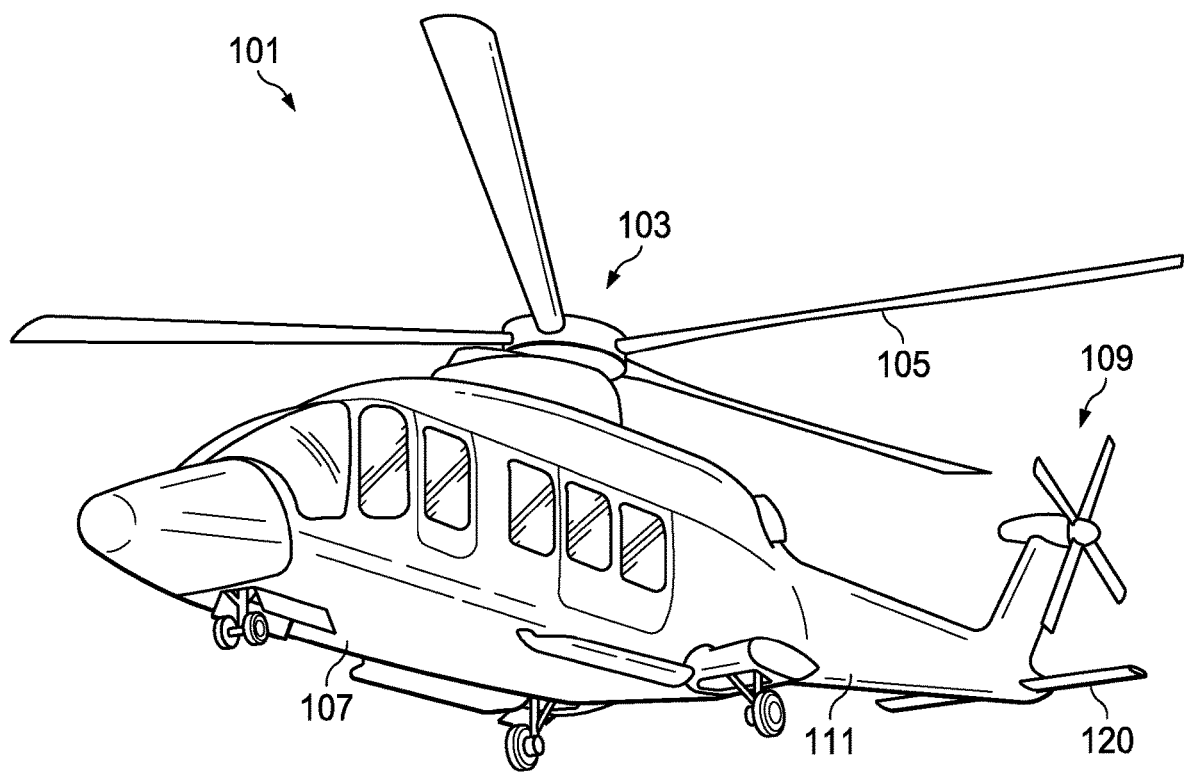

FIGS. 1A and 1B illustrate an example of an aircraft, which in this case is a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 can be managed or adjusted in order to selectively control direction, thrust, and lift of rotorcraft 101. Rotorcraft 101 further includes a fuselage 107, anti-torque system 109, an empennage 111, and a tail structure 120. In this example, tail structure 120 can represent a horizontal stabilizer. Torque is supplied to rotor system 103 and anti-torque system 109 using one or more engines. Each engine can apply a torque to the rotor system 103 to rotate the rotor blades 105 at a rotational frequency.

Figure 2:
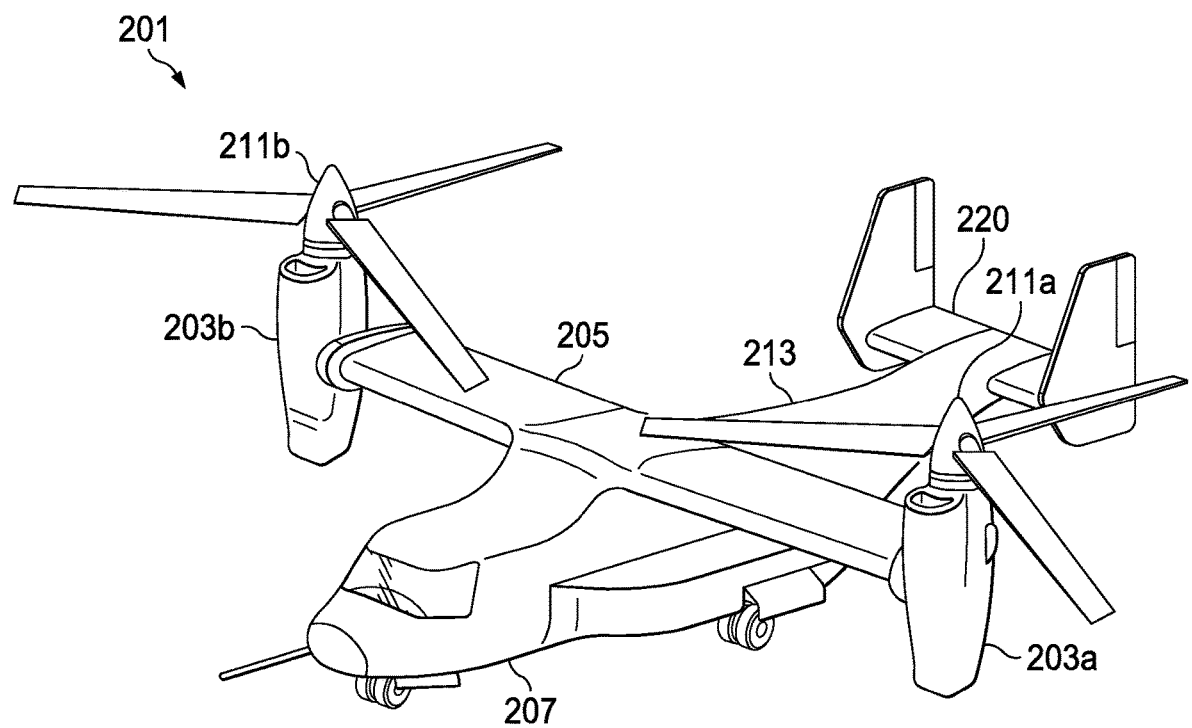

FIG. 2 illustrates a perspective view of an example of an aircraft, which in this case is a tiltrotor aircraft 201. Tiltrotor aircraft 201 include nacelles 203a and 203b, a wing 205, a fuselage 207, empennage 213, and a stabilizer structure 220. Each nacelle 203a and 203b can include an engine and gearbox for driving rotor systems 211a and 211b, respectively. The engines can apply a torque to rotor systems 211a and 211b, respectively, to rotate rotor blades at a rotational frequency. Nacelles 203a and 203b are each configured to rotate between a helicopter mode, in which the nacelles 203a and 203b are approximately vertical (as illustrated in FIG. 2), and an airplane mode, in which the nacelles 203a and 203b are approximately horizontal. In the helicopter mode the nacelle 203a and 203b and the rotor systems 211a and 211b are positioned substantially vertical to provide a lifting thrust. In the airplane mode the nacelle 203a and 203b and the rotor systems 211a and 211b are positioned substantially horizontal to provide a forward thrust in which a lifting force is supplied by the wing 205. It should be appreciated that tiltrotor aircraft 201 can be operated such that the nacelle 203a and 203b and the rotor systems 211a and 211b are selectively positioned between airplane mode and helicopter mode, which can be referred to as a conversion mode. In some examples, the rotor blades of the rotor systems 211a and 211b, rotate at a first rotational frequency when in the helicopter mode and rotate at a second rotational frequency when in the airplane mode.

Figure 3:
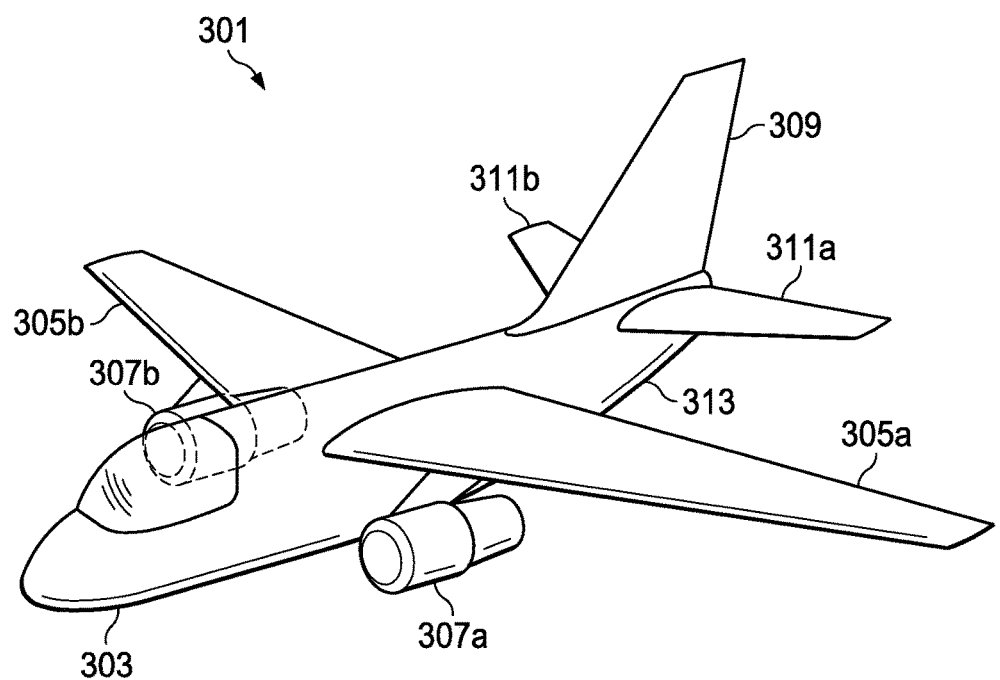

FIG. 3 illustrates a perspective view of an example of an aircraft, which in this case is a jet aircraft 301. The jet aircraft 301 includes a fuselage 303, wings 305a and 305b, and jet propulsion systems 307a and 307b, an empennage 313, a vertical stabilizer 309, and horizontal stabilizers 311a and 311b. The jet propulsion systems 307a and 307b include fixed jet engines. The jet propulsion systems 307a and 307b as well as control surfaces on the wings 305a and 305b, the vertical stabilizer 309, and/or the horizontal stabilizers 311a and 311b, which can be selectively controlled in order to selectively control direction, thrust, and lift of the jet aircraft 301.

It should be appreciated that the rotorcraft 101, the tiltrotor aircraft 201, and the jet aircraft 301 of FIGS. 1A, 1B, 2, and 3 are merely illustrative of a variety of aircraft that can be used to implement embodiments of the present disclosure. Other aircraft implementations can include, for example, hybrid aircraft, gyrocopters, drones, a variety of helicopter configurations, among other examples. Moreover, it should be appreciated that even though aircraft are particularly well suited to implement embodiments of the present disclosure, the described embodiments can also be implemented using non-aircraft vehicles and devices.

Rotor systems (e.g., rotor system 103 on the rotorcraft 101 and rotor systems 211a and 211b of the tiltrotor aircraft 201) are a major source of vibrations affecting an aircraft. The engines and transmission apply a torque to the rotor system to rotates the rotor blades at a rotational frequency or "0". During operation, when all the rotor blades of the rotor system are rotating, the rotor blades collectively cause structures supporting the blades to vibrate. For example, such structures subjected to vibrations can include, but are not limited to a mast supporting the blades, an airframe to which the mast is attached, an empennage or a tail boom attached to the airframe, a wing supporting the rotor system, and the like. The frequency of such vibrations is sometimes referred to as N per revolution and is commonly abbreviated and referred to herein as "N-per-rev." N-per-rev is a function of, among other things, the number of blades, "N", in the rotor system, i.e., assuming identical rotor blades are equally spaced around a rotor hub and moving at a constant rotational velocity. N-per-rev is a frequency that is an integer multiple of the rotational frequency, $\Omega$, of the rotor system, where the integer is the number of blades in the system. For example, a rotor system operating at a rotational frequency of 5 Hz and comprising 3 blades has an N-per-rev equal to 3*5 Hz or 15 Hz. Likewise, a rotor system operating at the same rotational frequency and comprising 5 blades has an N-per-rev equal to 5*5 Hz or 25 Hz. The operational frequency is also referred to as 1-per-rev. Other integer multiples of the rotational frequency can have a dramatic impact on the vibration of components of an aircraft. For example, 2-per-rev is 2× the rotational frequency, which in the above example is 2*5 or 10 Hz; the 3-per-rev is 3× the rotational frequency, which in the above example is 3*5 or 15 Hz; etc. While the other vibration components contribute to overall vibrations of the aircraft, in many cases, n-per-rev is a dominant source of vibrations (e.g., in terms of design loads).

Though an aircraft component may have a first natural frequency is does not coincide with an operational frequency of an aircraft, it can still experience vibrations during the operation of the aircraft. Some aircraft components such as wings and empennages may have low inherent damping, which can cause the vibrations to decay slowly. Consequently, the aircraft components may be fitted with vibration control systems to mitigate such vibrations. In some vibration control systems, a weight is selected to counteract vibration at a particular frequency. Such a weight, when its mass is selected to counteract vibration at the particular frequency, is sometimes referred to as a "tuned mass." The tuned mass acts in a manner similar to a pendulum that can vibrate out-of-phase with the particular frequency and, thereby, provide an inertial force that counteracts vibrations at the particular frequency. One challenge is that a tuned mass can add significant weight to the aircraft, which could potentially reduce the operation efficiency of the aircraft and place additional stress on structural components that support such masses. Moreover, because a tuned mass is necessarily tuned to a particular frequency, it may be ineffective for counteracting vibrations at other frequencies. Indeed, a tuned mass system, which is tuned for a particular frequency, may actually exacerbate vibrations frequencies outside of the particular frequency.

A solution to the above-identified challenges (and others) disclosed herein includes vibration control systems that rely on inertia and/or resistance provided by moving a working fluid through a fluidic flexible matrix composite (FFMC) tube (also known as F²MC tubes). Embodiments of the present disclosure rely on inertance and resistance of a fluidic circuit, which are analogous to mass and damping properties in a mechanical vibration control system, to absorb vibrations. A damper includes structural damping, which dissipates energy to reduce the vibrations. Some dampers of the present disclosure utilize the resistance of the fluidic circuit between FFMC tubes to dissipate energy and, thereby, reduce vibrations. An absorber counteracts vibrations based on inertia of an object such as a mass. Some absorbers of the present disclosure utilize the inertance produced by FFMC tubes cyclically pumping a working fluid through a fluidic circuit between FFMC tubes to counteract vibration. Analogous to a pendulum, absorbers of the present disclosure can pump the working fluid out-of-phase with the vibration that it counteracts. Some embodiments of the present disclosure utilize an adjustable orifice to control the resistance of the fluidic circuit, which can be used to tune the damping characteristics of the system to multiple frequencies. While some traditional systems are tuned for a single frequency, embodiments of the present disclosure are advantageously tunable to two or more frequencies and/or a range of frequencies. The following figures provide details of the construction of fluidic flexible matrix composite (FFMC) tubes and their use in absorbers and dampers of the present disclosure.

FFMC tubes may be constructed or one or more materials including, e.g., anisotropic flexible matrix composite materials. FIG. 4 illustrates a portion of an anisotropic flexible matrix composite material 400 (i.e., the anisotropic composite material 400) in a three-dimensional coordinate system comprising axes X, Y, and Z. The anisotropic composite material 400 comprises multiple layers of strands that, together, contribute to the thickness ti. The strands may be made of carbon, steel, or another high strength material. Each of the multiple layers comprises strands oriented at an angle, α, relative to the X axis in FIG. 4. Alternating layers may be aligned at equal and opposite values of the angle α for example, +45° and −45°. In other specific examples, the angle α may be 15, 30, 40, or 55. The axes labeled 1 and 2 in the FIG. 4 correspond to a local coordinate system that is aligned with the angle α of the strands. Winding the strands in the alternating layers generates the anisotropic composite material 400 and imparts structural properties that are different in each of the axes 1 and 2. For example, the Young's moduli in a direction parallel to axis 1 may be a first value and the Young's moduli in a direction perpendicular to axis 1 and parallel to axis 2 may be a second value. Thus, the anisotropic composite material 400 is stiffer in one direction, such as parallel to axis 1, than in another direction, such as parallel to axis 2. Because of the anisotropic properties of the anisotropic composite material 400, the anisotropic composite material 400 can be used to form a portion of a fluidic flexible matrix composite (FFMC) tube, which can produce an internal pressure and change volume based on an axial strain. An example of such a tube is described below with respect to FIGS. 5A and 5B.

FIGS. 5A and 5B illustrate various details of a fluidic flexible matrix composite (FFMC) tube 500, in accordance with some embodiments of the present disclosure. FIG. 5A is a three-dimensional view of a portion of the FFMC tube 500. FIG. 5B is a transverse cross-section of the FFMC tube 500 of FIG. 5A. The FFMC tube 500 comprises a tube of the anisotropic composite material 400 (of FIG. 4) having an outer radius $r_1$ and a bladder 502 having an outer radius $r_2$. Together, the anisotropic composite material 400 and the bladder 502 enclose a working fluid 504 having an outer radius $r_3$. The bladder 502 is nested within the tube of the anisotropic composite material 400. The bladder 502 is made of a compliant material such as rubber or polyurethane and seals the working fluid 504 within the FFMC tube 500. The working fluid 504 may be a high density and low viscosity fluid such as a liquid coolant (e.g., a fluorocarbon oil). When the angle α is less than 55°, a tensile axial strain applied to the FFMC tube causes a volume of the FFMC tube to decrease, and compressive axial strain applied to the FFMC tube causes the volume of the FFMC tube to increase. The tube of the anisotropic composite material 400 can operate to pump the working fluid through a fluidic circuit based on axial strains, e.g., as is described in further detail below with respect to FIGS. 6, 7A, 7B, and 7C.

Figure 6:
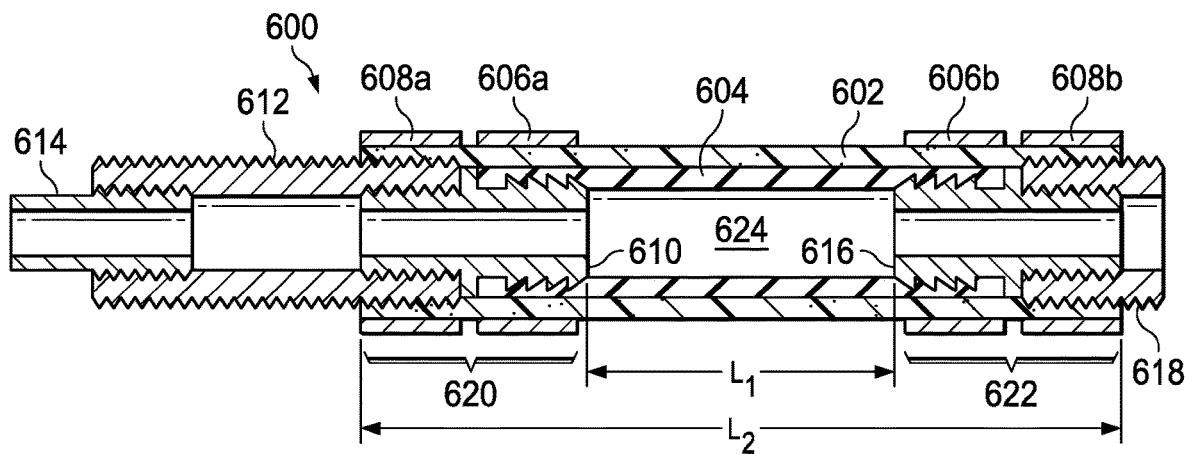

FIG. 6 illustrates a longitudinal cross-section through a fluidic flexible matrix composite (FFMC) tube 600, in accordance with some embodiments of the present disclosure. The FFMC tube 600 comprises an anisotropic composite tube 602, a bladder 604, end fittings 616 and 610, attachment fittings 618 and 612, a conduit fitting 614, sealant clamps 606a and 606b, and attachment crimps 608a and 608b. The sealant clamps 606a and 606b attach the anisotropic composite tube 602 and the bladder 604 to the end fittings 616 and 610, respectively. The sealant clamps 606a and 606b create a liquid tight-seal to retain fluid (such as a working fluid) in an internal channel 624. Threads on the attachment fittings 612 and 618 interlock with threads on the end fittings 610 and 616, respectively. The attachment crimp 608a attaches the anisotropic composite tube 602 around the attachment fittings 612 and the end fitting 610. The attachment crimp 608b attaches the anisotropic composite tube 602 around the attachment fittings 618 and the end fitting 616. Threaded ends of the attachment fittings 618 and 612 extend out from the attachment crimps 608a and 608b. These threaded ends are configured to attach the FFMC tube 600 to another object such as an aircraft component. For example, fasters such as nuts, washers and the like may be utilized attached to the exposed threaded ends of the attachment fittings 618 and 612 to a plate, which is coupled to an aircraft component, or may be directly coupled to the aircraft component. The conduit fitting 614 is configured to fluidically couple the FFMC tube 600 to a conduit in fluidic circuit. A nominal length $L_2$ of the FFMC tube 600 is measured between extreme ends of the attachment crimps 608a and 608b. An effective length $L_1$ of the FFMC tube 600 is measured between obstructions to the volume change of the FFMC tube 600, which in this case is the end fittings 610 and 616. The effective length $L_1$ may be selected to damp or absorb vibrations at a desired frequency. The effective length $L_1$ varies as the FFMC tube 600 changes volume when pumping a working fluid as illustrated in FIGS. 7A, 7B, and 7C.

Figure 7A:
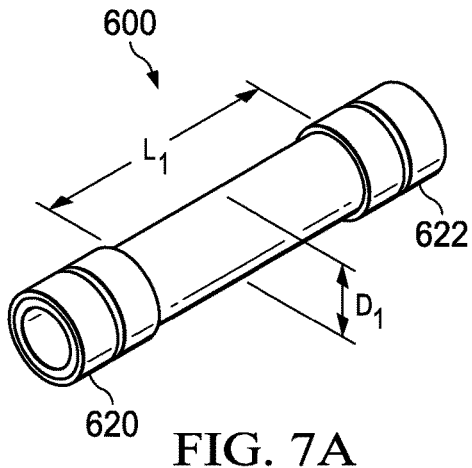
Figure 7B:
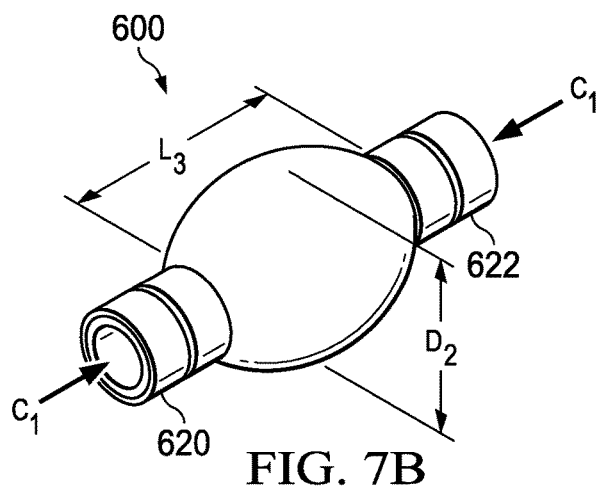
Figure 7C:
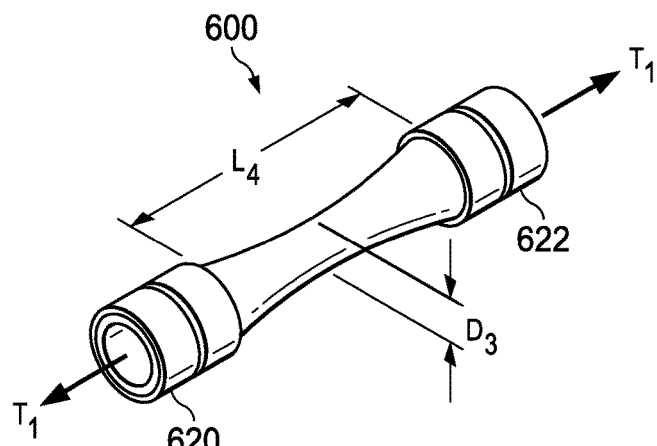

FIGS. 7A, 7B, and 7C illustrate the FFMC tube 600 pumping a working fluid, in accordance with some embodiments of the present disclosure. FIG. 7A illustrates the FFMC tube 600 in a neutral state where no axial strain is applied to the FFMC tube 600. Thus, the effective length $L_1$ is unchanged (e.g., relative to FIG. 6) and the outside diameter of the FFMC tube is $D_1$. As described above with respect to FIGS. 4, 5A, and 5B, the angle α determines the structural properties of an anisotropic composite material comprised in an FFMC tube and, therefore, determines some dynamic behavior of the FFMC tube. In the example of FIGS. 7A, 7B, and 7C, the angle α is approximately 45°. Because the angle α is less than 55°, a tensile axial strain applied to the FFMC tube 600 causes a volume of the FFMC tube 600 to decrease, and compressive axial strain applied to the FFMC tube 600 causes a volume of the FFMC tube 600 to increase. FIG. 7B illustrates a compressive axial strain $C_1$ applied to the FFMC tube 600. Under the compressive axial strain $C_1$ the FFMC tube 600 increases volume of the FFMC tube 600 and a maximum outside diameter of the FFMC tube is $D_2$, which is greater than the outside diameter $D_1$ of the neutral state. In addition, the effective length $L_3$ decreases relative to the neutral state, i.e., $L_1 > L_3$. The FIG. 7C illustrates a tensile axial strain $T_1$ applied to the FFMC tube 600. Under the tensile axial strain $T_1$ the FFMC tube 600 decreases volume of the FFMC tube 600 and a minimum outside diameter of the FFMC tube is $D_3$, which is less than the outside diameter $D_1$ of the neutral state. In addition, the effective length 1.4 increases relative to the neutral state, i.e., $L_4 > L_1$.

The FFMC tube 600 is filled with a working fluid. Thus, when the FFMC tube 600 is strained (e.g., shortened or stretched) and change volume, it creates a pressure differential pumps the working fluid. The constraining effect of the multiple layers of strands in the FFMC tube 600 allows the FFMC tube 600 to pump up to two orders of magnitude more fluid per unit axial strain than can a piston of the same diameter. Advantageously, a small mass of fluid being pumped by the FFMC tubes can provide the same effect as a large inertia from a relatively large mass.

Two or more FFMC tubes (e.g., similar to the FFMC tube 600) may be coupled to one another by a fluidic circuit including one or more conduits and a valve. The valve can change the resistance to flow through the fluidic circuit. Flow resistance caused by the valve the fluidic circuit as well as frictional losses the conduits can contribute to damping provided by a vibration control system using FFMC tubes. While the overall mass of the working fluid remains constant because it is contained by the fluidic circuit and tubes, the stiffness and damping provided by the system can be varied based on changing the size of the orifice, e.g., in real time. Because the FFMC tubes change volume in response to axial strain, they pump fluid through the fluidic circuit to create fluid inertance. By opening or closing a valve, the amount of damping or isolation frequency can be adjusted and optimized. Advantageously, each of stiffness, mass, and damping are tunable. For example, the stiffness is tunable based on a length and a diameter of the FFMC tube, the mass is tunable based on the amount of working fluid used in the system, and damping is tunable based on a length conduit in the fluidic matrix, among other things. Advantageously, the variety of tunable characteristics provided by such a system enables more flexibility and customization that is offered with traditional vibration control systems.

Figure 8:
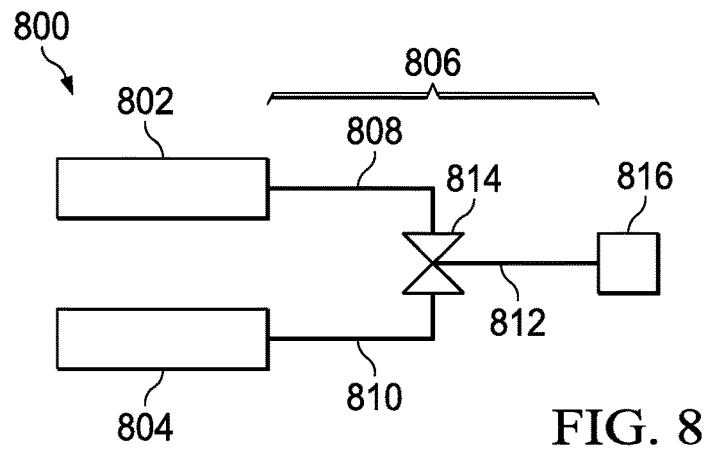
FIGS. 8, 9, and 10 illustrate simplified component diagrams of vibration control systems comprising fluidic flexible matrix composite tubes, in accordance with some embodiments of the present disclosure.

FIG. 8 is simplified component diagram of vibration control system 800. The vibration control system 800 includes FFMC tubes 802 and 804 fluidically coupled to a fluidic circuit 806. The fluidic circuit 806 includes conduits 808, 810, and 812, a valve 814, and a reservoir 816. The fluidic circuit 806 is operable to carry a capacity of a working fluid between the FFMC tubes 802 and 804 and the reservoir 816 via the valve 814. Each of the FFMC tubes 802 and 804 include an anisotropic composite material that enables them to pump a working fluid, e.g., as described with respect to FIGS. 7A, 7B, and 7C. The working fluid circulates through the fluidic circuit 806 based on the pumping action of the FFMC tubes 802 and 804. The conduit 808 is coupled between the FFMC tube 802 and the valve 814. The conduit 810 is coupled between the FFMC tube 804 and the valve 814. The conduit 812 is coupled between the valve 814 and the reservoir 816. The valve 814 is positioned between the FFMC tubes 802 and 804 in the fluidic circuit 806. The valve 814 is operable to open and close to control a resistance to flow of the working fluid through the conduits 808, 810, and 812. This resistance to flow may be increases or decreases to increase or decrease the damping provided by the vibration control system 800. For example, the valve 814 may be set to a closed position to completely obstruct an orifice in valve 814 (i.e., setting relatively high damping), an open position to completely open the orifice (i.e., setting relatively low damping), or one or more intermediate positions between the first position and the second position. The reservoir 816 can hold a capacity of liquid that is pumped from the FFMC tubes 802 and 804. In addition, the FFMC tubes 802 and 804 may draw liquid from the reservoir 816 as they fill with liquid. In some cases, the valve may be set to a specific position manually, e.g., by a maintenance person.

The specific pumping action of each of the FFMC tubes 802 and 804 is based on the relative displacement the other. For example, when both of the FFMC tubes 802 and 804 experience approximately the same axial strain (e.g., same magnitude and direction), the FFMC tubes 802 and 804 will pump in the same direction and will fill or draw working fluid from the reservoir 816. Such a situation may occur, e.g., when both of the FFMC tubes 802 and 804 are placed on the same side of a neutral axis of a bending beam (see, e.g., FIGS. 12A and 12B below). Alternatively, when the FFMC tubes 802 and 804 experience approximately equal and opposite axial strains, the FFMC tubes 802 and 804 will pump in the opposite directions and will exchange the working fluid in approximately amounts from one another and will neither fill nor draw working fluid from the reservoir 816. Such a situation may occur, e.g., the FFMC tubes 802 and 804 are placed on the opposite side of a neutral axis of a bending beam (see, e.g., FIG. 14). It is noted that some embodiments of the vibration control system 800 may exclude the reservoir 816 and, instead, the conduit 812 may serve as a linear reservoir or an inertia track in which the working fluid can accumulate as needed based on the pumping of the FFMC tubes 1608a and 1608b. The frictional losses experienced by the working fluid along the length of the inertia track can also contribute to the damping provided by the vibration control system 800.

In some examples, the vibration control system 800 provides damping to an aircraft component based on fluid resistance of the fluidic circuit 806. For example, an aircraft component may have low inherent damping, which can cause vibrations introduced to the aircraft component to decay slowly. Advantageously, the damping provided by frictional losses of a working fluid flowing through the conduits 808, 810, and 812 can be used to add damping to the aircraft component. The added damping can increase total damping (e.g., the sum of inherent damping and added damping) to equal or exceed a threshold value. Damping provided by the fluidic circuit 806 can be adjusted based on several factors including, e.g., a position of the valve 814, a diameter of one or more of the conduits 808, 810, and 812, a length of one or more of the conduits 808, 810, and 812, and/or combinations thereof. One or more of the factors may be used to tune the damping to a particular level. As described above, the valve 814 is movable between an open position to completely open an orifice through which the working fluid can flow; a closed position to completely obstruct the orifice; and a plurality of intermediate positions between the open position and the closed position. The intermediate positions can correspond to fractions of open and/or closed and may be adjusted to increase or decrease the frictional losses in the fluidic circuit 806. The valve may add little or no frictional losses when in the open position (e.g., a minimum value). The frictional losses increase as the valve is moved from the open position toward the closed position (i.e., through the intermediate positions). The length and radius of the inertia track (e.g., conduit 812) can be used to adjust the inertance of the working fluid and/or the resistance of the fluidic circuit 806. The inertance provided by the working fluid is inversely proportional to the square of the radius (e.g., r2) of the inertia track and is proportional to a length of the inertia track. The resistance of the fluidic circuit 806 is inversely proportional to the r4 of the inertia track. In general, damping increases as the radius of a conduit decreases. A large radius corresponds to low flow resistance and, therefore, lower damping. A small radius corresponds to high flow resistance and, therefore, higher damping. In some cases, the track is designed to provide a desired level of inertance with relatively low damping provided by the inertia track. In such cases, the valve is used a primary source of flow resistance and therefore, damping in the vibration control system 800. Some exemplary models, designs, and design processes related to FFMC tubes and fluidic circuits are discussed in a 2016 thesis by Kentaro Miura titled, "MODELING, DESIGN, AND EXPERIMENTAL VALIDATION OF A TAILBOOM VIBRATION ABSORBER USING FLUIDIC FLEXIBLE MATRIX COMPOSITE TUBES," which is hereby incorporated by reference in its entirety.

Figure 9:
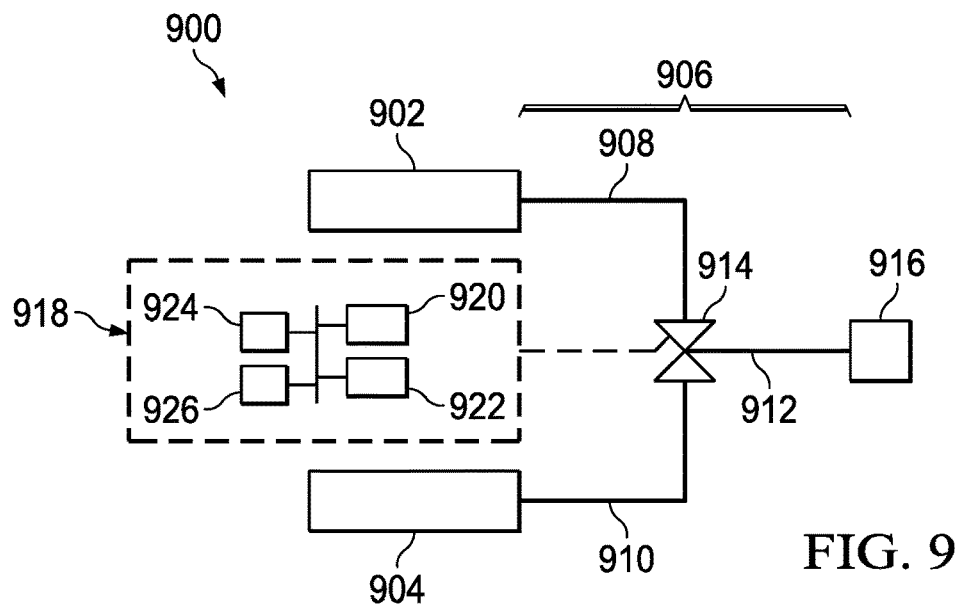

FIG. 9 is simplified component diagram of a vibration control system 900. The vibration control system 900 includes FFMC tubes 902 and 904 fluidically coupled to a fluidic circuit 906. The fluidic circuit 906 includes conduits 908, 910, and 912, valve 914, and a reservoir 916. Many components of the FIG. 9 are similar to corresponding components in the FIG. 8; the description of such components is not repeated here only for the sake of brevity. A difference from the vibration control system 800 of FIG. 8 is that the vibration control system 900 of FIG. 9 includes a processing unit 918. The processing unit includes a controller 920, a sensor 922, a processor 924, and a memory 926.

The controller 920 is operable to actively control absorption and/or damping of vibrations via the FFMC tubes 902 and 904 based on actuating the valve 914. The controller 920 may comprise an active control device such as a servomotor to open and close the valve 914. The controller 920 may utilize the processor 924 to receive, process, and execute actions based on readings from the sensor 922. The sensor 922 may include an accelerometer, a gyroscope, or other sensor operable of directly or indirectly detecting vibrations and/or vibration frequency. In such examples, the controller 920 may actively control absorption and/or damping of the vibration via the FFMC tubes 902 and 904 by: opening the valve 914 to decrease the stiffness of the FFMC tubes 902 and 904 based on the sensor 922 detecting that the vibration is in a first frequency range, opening the valve 914 to increase the stiffness of the FFMC tubes 902 and 904 based on the sensor 922 detecting that the vibration is in a second frequency range. Advantageously, the controller 920 eliminates the need for manual control of the valve 914. Instead, the controller 920 can dynamically (e.g., in near real-time) modify the stiffness of the FFMC tubes 902 and 904. Such modification can occur while an aircraft on which the controller 920 is located is airborne. This can significantly reduce vibrations for a wide range of frequencies, which can improve the service life of an aircraft component to which the system is connected. for example, the controller 920 can actively set the stiffness of the FFMC tubes 902 and 904 to a first value based on a tiltrotor aircraft operating in helicopter mode (i.e., at a first operational frequency) and, at another point in time, actively set the stiffness of the FFMC tubes 902 and 904 to a second value based on a tiltrotor aircraft operating in airplane mode (i.e., at a second operational frequency).

The processor 924 executes instructions from the memory 926 and/or other memory elements such as other memory accessible to the vibration control system 900. The processor 424 may comprise a microprocessor, controller, an application-specific integrated circuit (ASIC), a field programmable gate array (FPGA), digital signal processor (DSP), or any other suitable computing device, resource, or combination of hardware, stored software and/or encoded logic operable to process data.

The memory 926 may comprise any form of volatile or non-volatile memory including, without limitation, magnetic media (e.g., one or more tape drives), optical media, random access memory (RAM), read-only memory (ROM), flash memory, removable media, an erasable programmable read only memory (EPROM), an electrically erasable programmable ROM (EEPROM)), a memory element in an application-specific integrated circuit (ASIC), a memory element in a field programmable gate array (FPGA), or any other suitable memory component or components. In some examples, the memory stores executable instructions that relate the readings from the sensor 922 to a state of the valve 914. In some examples, the controller 920 and/or the processor 924 cooperate to execute such instructions. The memory 926 may store a correspondence such as a table between a frequency of a vibration a position of a valve in a fluidic circuit. The controller 920 may sets the position of the valve based on the correspondence.

Operations outlined herein may be implemented using logic, which can include fixed logic, hardware logic, programmable logic, digital logic, etc. For example, in some embodiments, logic may be encoded in one or more tangible media, which may be inclusive of non-transitory tangible media and/or non-transitory computer readable storage media (e.g., embedded logic provided in an ASIC, embedded logic provided in an FPGA, logic provided digital signal processing instructions, in software [potentially inclusive of object code and source code] to be executed by a processor, or other similar machine, etc.).

Figure 10:
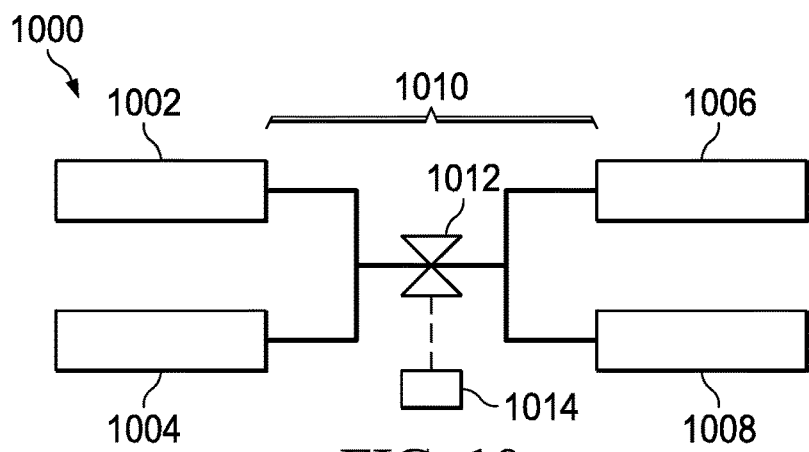

FIGS. 8 and 9 illustrate the vibration control systems 800 and 900, respectively, each having two FFMC tubes. However, embodiments of the present disclosure are not limited to such embodiments. The teachings of the present disclosure are applicable to various numbers and configurations of FFMC tubes. Some embodiments of the present disclosure may include 1, 2, 4, 8, 10, or any other number of FFMC tubes. As an example, FIG. 10 is simplified component diagram of a vibration control system 1000, which includes four FFMC tubes 1002, 1004, 1006, and 1008 fluidically coupled to a fluidic circuit 1010. The fluidic circuit 1010 includes conduits, a valve 1012, and a processing unit 1014. Many components of the FIG. 10 are similar to corresponding components in the FIG. 9; the description of such components is not repeated here only for the sake of brevity.

Figure 11A:
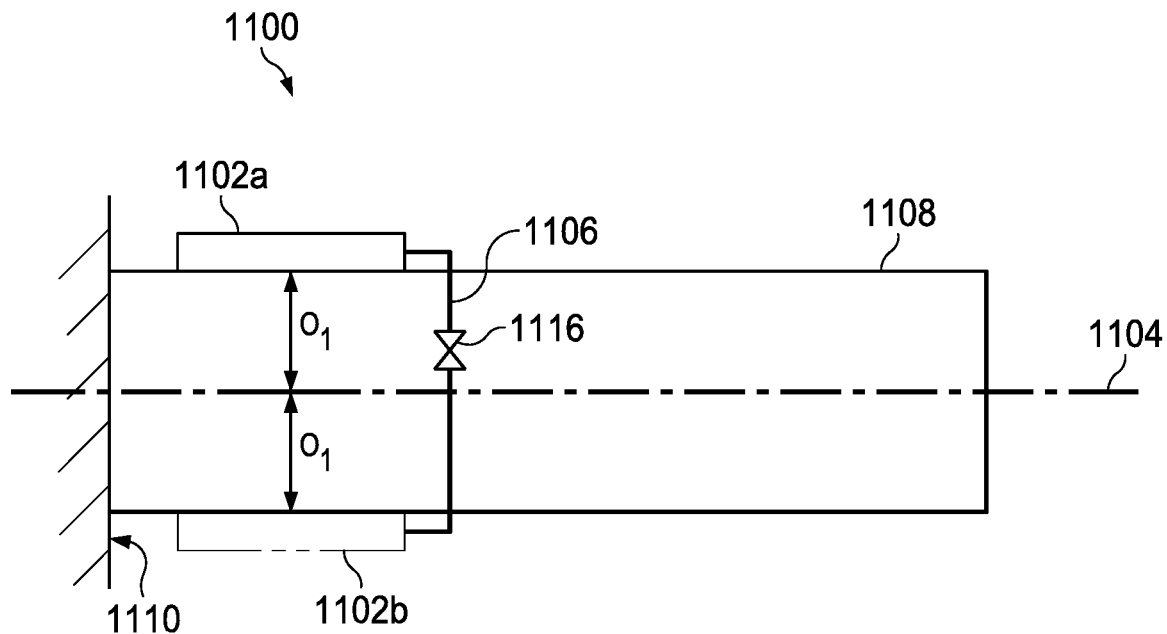
FIGS. 11A and 11B illustrate simplified diagrams of a vibration control system in operation on a cantilever, in accordance with some embodiments of the present disclosure.
Figure 11B:
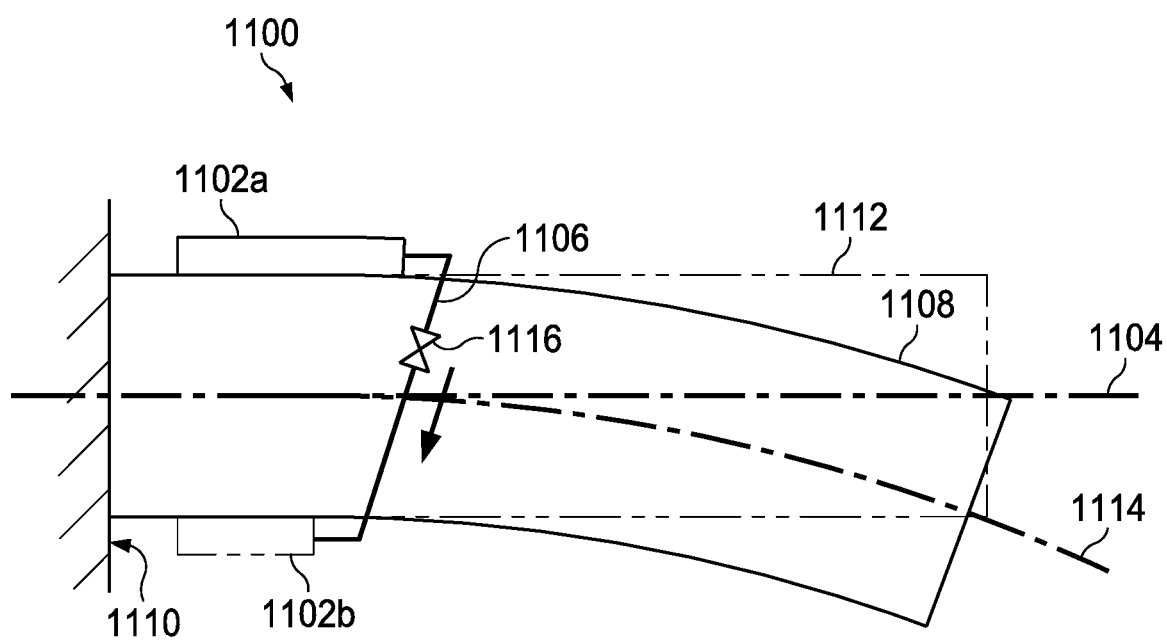

FIGS. 11A and 11B illustrate simplified diagrams of a system 1100 including a cantilevered beam 1108, in accordance with some embodiments of the present disclosure. FIG. 11A illustrates the system 1100 when the cantilevered beam 1108 is in an undeformed state. The system 1100 includes a supporting structure 1110, the cantilevered beam 1108, FFMC tubes 1102a and 1102b, and a fluidic circuit 1106. The cantilevered beam 1108 is rigidly attached to the supporting structure 1110 such as by fasteners and/or welds. Each of the FFMC tubes 1102a and 1102b is rigidly coupled to the cantilevered beam 1108 at a position that is offset from a neutral axis of the cantilevered beam 1008 a distance $O_1$. The fluidic circuit 1106 fluidically couples the FFMC tubes 1102a and 1102b to one another. The fluidic circuit 1106 includes a valve 1116, which may be selectively opened or closed to change the resistance to flow of a working fluid through the fluidic circuit 1106. When the cantilevered beam 1108 is undeformed, each of the FFMC tubes 1102a and 1102b is in a neutral state, e.g., as described with respect to FIG. 7A.

Each of the FFMC tubes 1102a and 1102b are configured to damp a vibration of the cantilevered beam 1108 based on a stiffness of the respective FFMC tube. The stiffness of the FFMC tubes 1102a and 1102b is a function of at least the fluid resistance of the fluidic circuit 1106. In some examples, the cantilevered beam 1108 may correspond to an aircraft component that is subjected to vibrations during operation of an aircraft. The vibrations cause the cantilevered beam 1108 to oscillate between deflecting in an upward direction and deflecting in a downward direction relative to that shown in FIG. 11A. The variation of stiffness and damping in the fluidic circuit 106 allows for a tuned response at multiple frequencies by manipulating the valve 1116. By opening or closing the valve 1116, the natural frequency of the system can be changed.

FIG. 11B illustrates the system 1100 when cantilevered beam 1108 is in a deformed state and is deflecting in a downward direction. The FFMC tube 1102a is coupled to a top of the cantilevered beam 1108. The FFMC tube 1102b coupled to a bottom of the cantilevered beam 1108. When the cantilevered beam 1108 is deflected in a downward direction, the top of the cantilevered beam 1108 elongates and the bottom of the cantilevered beam 1108 shortens. Thus, the FFMC tube 1102a receives a tensile axial strain and the FFMC tube 1102b receives a compressive axial strain from the cantilevered beam 1108. Because the FFMC tubes 1102a and 1102b are equidistant from the neutral axis, the strains are equal and opposite to one another. Each of the FFMC tubes 1102a and 1102b pump a working fluid though the fluidic circuit 1106 based on the axial strains. For example, the FFMC tube 1102a decreases in volume, which pumps the working fluid from the FFMC tube 1102a into the fluidic circuit 1106 based on the tensile axial strain, e.g., as illustrated in FIG. 7C. The FFMC tube 1102b increases in volume, which sucks the working fluid into FFMC tube 1102b from the fluidic circuit 1106 based on the compressive axial strain, e.g., as illustrated in FIG. 7B. The pumping and suction by the FFMC tubes 1102a and 1102b balance one another and force the working fluid to move from the FFMC tube 1102a toward the FFMC tube 1102b. During operation of the aircraft, the cantilevered beam 1108 may be oscillate between deflecting in the downward direction and the deflecting in an upward direction where the strains experienced by the FFMC tubes 1102a and 1102b is reversed, i.e., the FFMC tube 1102a receives a compressive axial strain and the FFMC tube 1102b receives a tensile axial strain. Thus, the working fluid may be cycled back and forth between the FFMC tubes 1102a and 1102b via the fluidic circuit 1106.

FIGS. 12A, 12B, 13A, 13B, 14, and 15 illustrate various configurations in which multiple FFMC tubes may be coupled to an aircraft component to provide vibration control in a vibration control system, in accordance with some embodiments of the present disclosure.

Figure 12A:
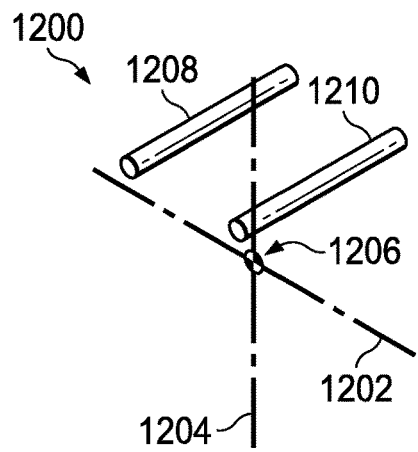
FIGS. 12A, 12B, 13A, 13B, 14, and 15 illustrate various configurations of multiple FFMC tubes in vibration control systems, in accordance with some embodiments of the present disclosure.
Figure 12B:
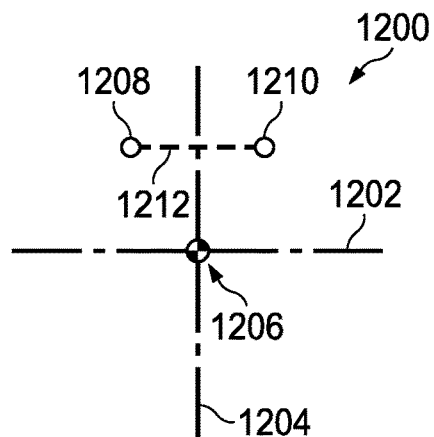

FIGS. 12A and 12B illustrate a configuration 1200 of two FFMC tubes 1208 and 1210 coupled by a fluidic circuit 1212. FIG. 12A is a three-dimensional view of the configuration 1200. FIG. 12B is a front view of the configuration 1200. The configuration 1200 is organized around a set of axes 1202 and 1204 which pass through a neutral point 1206 of an aircraft component (not shown). A neutral point may be inclusive of a centroid of a cross sectional shape, an intersection of a vertical neutral axis and a horizontal neutral axis, a center of stiffness of the aircraft component, or another geometric, structural, or analytical neutral point of an aircraft component. The location the FFMC tubes 1208 and 1210 is symmetric with respect to the neutral point 1206. Advantageously, the symmetric configuration prevents the stiffness provided by the FFMC tubes 1208 and 1210 from introducing lateral eccentricities that could erroneously induce torsion while the FFMC tubes 1208 and 1210 control vibrations of the aircraft component.

Figure 13A:
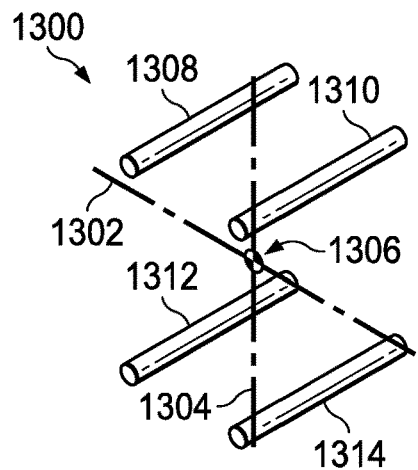
Figure 13B:
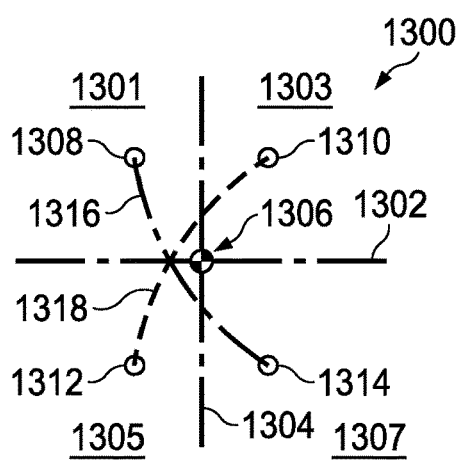

FIGS. 13A and 13B illustrate a configuration 1300 of four FFMC tubes 1308, 1310, 1312, and 1314. FIG. 13A is a three-dimensional view of the configuration 1300. FIG. 13B is a front view of the configuration 1300. The configuration 1300 is organized around axes 1302 and 1304 which pass through a neutral point 1306 of an aircraft component (not shown). The axes 1302 and 1304 divide the cross section into quadrants 1301, 1303, 1305, and 1307. Each of the FFMC tubes 1308, 1310, 1312, and 1314 is coupled to the aircraft component and configured to damp a torsional vibration of the aircraft component based on the FFMC tubes being fluidically coupled to one another and positioned in different ones of the quadrants that are located diagonal to one another.

As illustrated in FIG. 13B, the FFMC tubes 1308 and 1314 are fluidically coupled to one another by a fluidic circuit 1316 and are located in quadrants 1301 and 1307, respectively, which are diagonal to one another. In addition, the FFMC tubes 1310 and 1312 are fluidically coupled to one another by a fluidic circuit 1318 and are located in quadrants 1303 and 1305, respectively, which are diagonal to one another. In effect, the FFMC tubes are divided into two pairs that are fluidically coupled between quadrants located diagonally from one another. The fluidic circuits 1316 and 1318 are independent and are isolated from one another. Thus, the FFMC tubes 1308 and 1314 are fluidically coupled to one another and are fluidically decoupled from the FFMC tubes 1310 and 1314, which are located in adjacent quadrants. In some embodiments, each of the fluidic circuits 1316 and 1318 includes the components as described with respect to the fluidic circuits of FIG. 8. In other embodiments, each of the fluidic circuits 1316 and 1318 includes the components as described with respect to the fluidic circuits of FIG. 9. Each of the FFMC tubes is configured to receive an axial deformation based on the torsional vibration. Advantageously, the configuration 1300 can directly damp the torsional vibration, which may cause twisting that induces equal and opposite axial strains in quadrants of the aircraft component that are at diagonal positions relative to one another. For example, the FFMC tube 1308 may receive a tensile axial strain based on the torsional vibration while, simultaneously, the FFMC tube 1314 receives a compressive axial strain based on the torsional vibration (or vice versa). As another example, the FFMC tube 1310 may receive a tensile axial strain based on the torsional vibration while, simultaneously, the FFMC tube 1312 receives compressive axial strain based on the torsional vibration (or vice versa).

Figure 14:
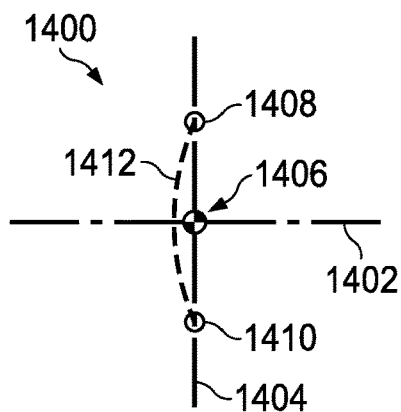

FIG. 14 illustrates a front view of a configuration 1400 of two FFMC tubes 1408 and 1410 coupled by a fluidic circuit 1412. The configuration 1400 is organized around a set of axes 1402 and 1404 which pass through a neutral point 1406 of an aircraft component (not shown). The location the FFMC tubes 1408 and 1410 is symmetric with respect to the neutral point 1406. Advantageously, the symmetry of the configuration 1400 prevents the stiffness provided by the FFMC tubes 1408 and 1410 from introducing lateral or vertical eccentricities that could erroneously induce torsion while the FFMC tubes 1408 and 1410 control vibrations of the aircraft component.

Figure 15:
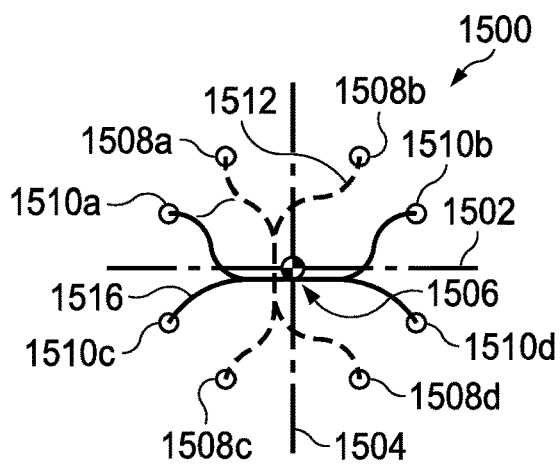

FIG. 15 a front view of a configuration 1500 of eight FFMC tubes 1508a, 1508b, 1508c, 1508d, 1512a, 1512b, 1512c, and 1512d. The configuration 1500 is organized around axes 1502 and 1504 which pass through a neutral point 1506 of an aircraft component (not shown). The FFMC tubes 1508 (i.e., 1508a, 1508b, 1508c, and 1508d) are coupled via a fluidic circuit 1512. The FFMC tubes 1510 (i.e., 1510a, 1510b, 1510c, and 1510d) are coupled via a fluidic circuit 1516. Because the FFMC tubes 1508 are offset farther from the axis 1502 than the FFMC tubes 1510, the FFMC tubes 1508 may more efficiently damp vertical vibrations than the FFMC tubes 1510, e.g., due to the FFMC tubes 1508 having a longer moment arm distance relative to the axis 1502. In addition, Because the FFMC tubes 1510 are offset farther from the axis 1504 than the FFMC tubes 1508, the FFMC tubes 1510 may more efficiently damp horizontal vibrations than the FFMC tubes 1508, e.g., due to the FFMC tubes 1508 having a longer moment arm distance relative to the axis 1504. Thus, the configuration 1500 may simultaneously damp vertical vibrations based on the FFMC tubes 1508, lateral vibrations based on the FFMC tubes 1510, and torsional vibrations based on a combination of the FFMC tubes 1508 and 1510.

Figure 16:
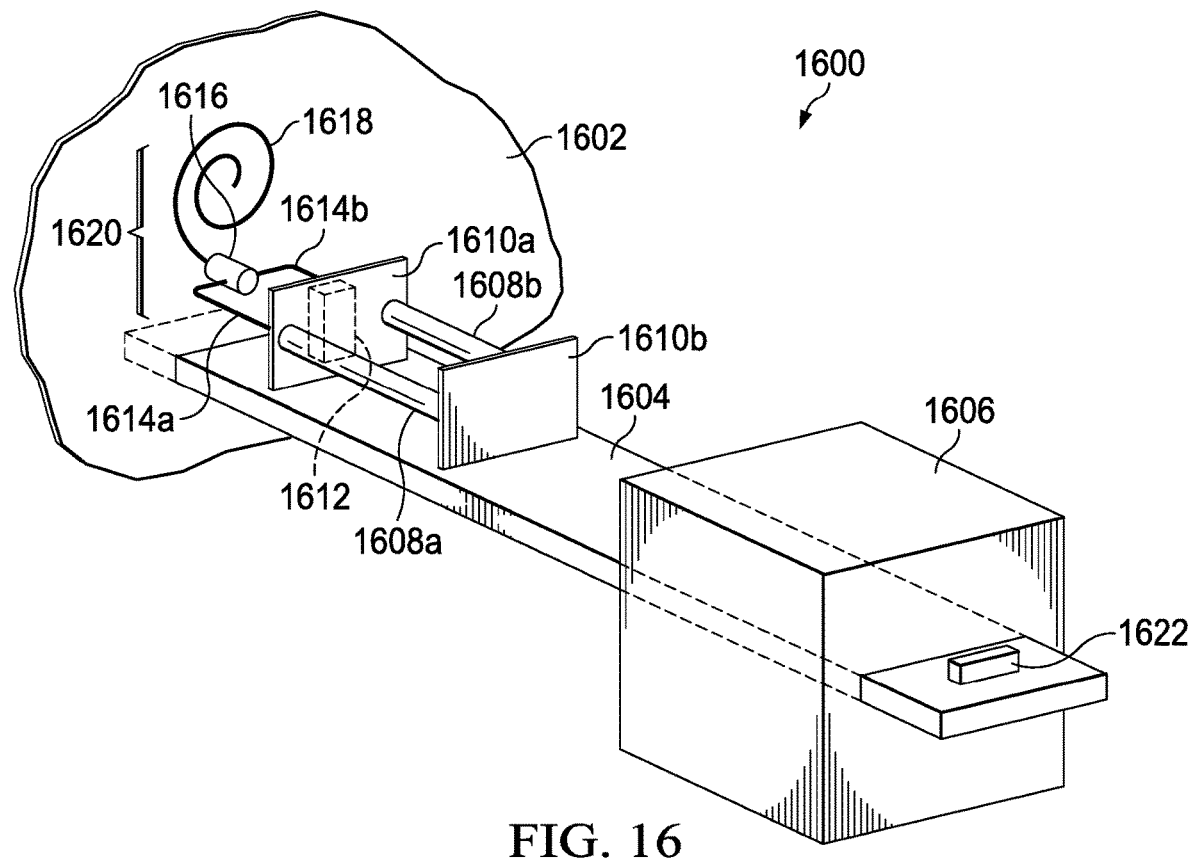
FIGS. 16, 17, 18, and 19 illustrate details of multiple frequency vibration absorbers, in accordance with some embodiments of the present disclosure.
Figure 17:
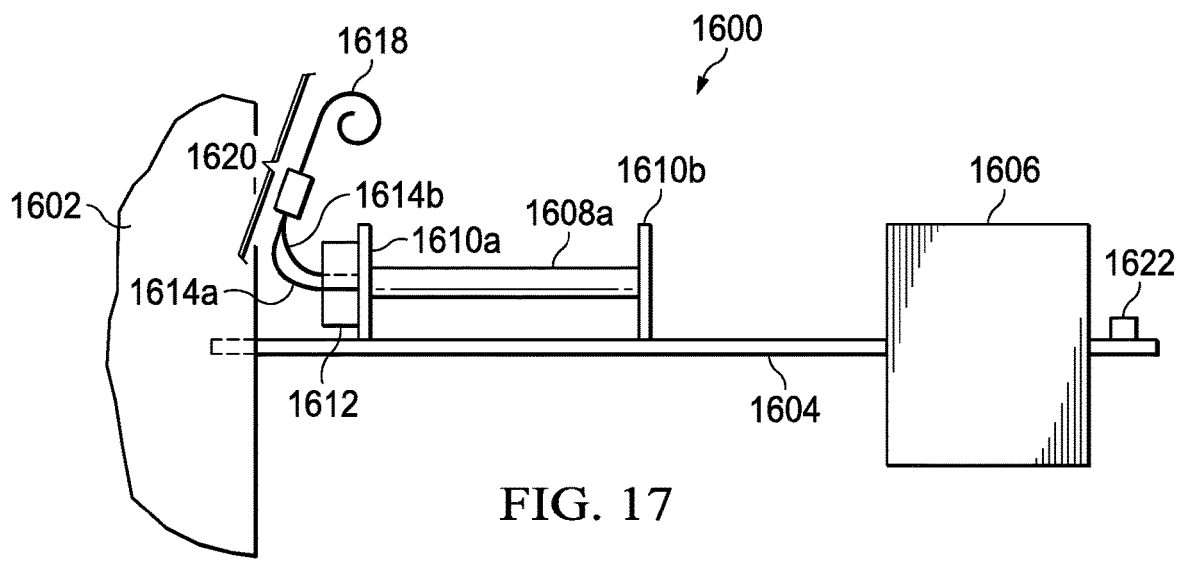

FIGS. 16 and 17 illustrate details of multiple frequency vibration absorber 1600 coupled to an aircraft component 1602, in accordance with some embodiments of the present disclosure. FIG. 16 is a three-dimensional view of the multiple frequency vibration absorber 1600. FIG. 17 is a side view of the multiple frequency vibration absorber 1600. The aircraft component 1602 may be coupled to an aircraft and may receive vibrations from the aircraft such as 1-per-rev, 2-per-rev, N-per-rev, or other vibrations. Advantageously, the multiple frequency vibration absorber 1600 is operable to absorb at least a portion of the vibrations of the aircraft component 1602 which can reduce the perceived vibration of the aircraft component 1602.

The multiple frequency vibration absorber 1600 includes a beam element 1604, a mass 1606, fluidic flexible matrix composite (FFMC) tubes 1608a and 1608b, attachment plates 1610a and 1610b, a controller 1612, a fluidic circuit 1620, and a sensor 1622. The beam element 1604 is attached to the aircraft component 1602. The mass 1606 is rigidly attached to the beam element 1604 and is configured to tune a natural frequency of the beam element 1604. Because the mass 1606 is rigidly attached to the beam it is fixed and stationary relative to the beam element 1604 (e.g., the mass 1606 does not move axially along the length of the beam element). The attachment plates 1610a and 1610b couple the FFMC tubes 1608a and 1608b to the beam element 1604. For example, the attachment plates 1610a and 1610b may be coupled to the beam element 1604 by a faster, a weld, and the like. The sensor 1622 is operable to detect a frequency of a vibration of the aircraft component. The FFMC tubes 1608a and 1608b are configured to absorb the vibration of the aircraft component 1602 based, at least in part, on a stiffness of the FFMC tubes 1608a and 1608b and/or the inertance of a working fluid pumped though the fluidic circuit 1620 by the FFMC tubes 1608a and 1608b. The controller 1612 actively control absorption of the vibration via the FFMC tubes 1608a and 1608b by controlling flow of a working fluid through the fluidic circuit 1620 based on frequency data received from the sensor 1622.

The fluidic circuit 1620 is fluidically coupled to each of the FFMC tubes 1608a and 1608b. The fluidic circuit 1620 includes the conduits 1614a, 1614b, and 1618 and a valve 1616. The fluidic circuit 1620 is filled with a working fluid, which is pumped based on axial strain experienced by the FFMC tubes 1608a and 1608b. The conduits 1614a and 1614b attach the FFMC tubes 1608a and 1608b, respectively, to the conduit 1618 via the valve 1616. The valve 1616 is to control the stiffness of the FFMC tubes 1608a and 1608b based on regulating a flow of the working fluid into and out of the FFMC tubes 1608a and 1608b. By controlling the stiffness of the FFMC tubes 1608a and 1608b, the valve 1616 also controls the inertance of the working fluid as it is pumped though the fluidic circuit 1620. The conduit 1618 may serve as a linear reservoir or an inertia track in which the working fluid can accumulate as needed based on the pumping of the FFMC tubes 1608a and 1608b. In some examples, the valve 1616 may be a ball valve, a plug valve, a globe valve, and or any other valve including an orifice and a barrier coupled to the orifice being moveable between an open and a closed position. Advantageously, the controller 1612 can actively control absorption of the vibration via the FFMC tubes 1608a and 1608b based on actuating the valve 1616. The controller 1612 may identify and modify a position of the valve 1616. For example, the controller 1612 can open the valve 1616 to decrease the stiffness of the FFMC tubes 1608a and 1608b based on the sensor detecting that the vibration is in a first frequency range and close the valve 1616 to increase the stiffness of the FFMC tubes 1608a and 1608b based on the sensor 1622 detecting that the vibration is in a second frequency range. In some examples, the first frequency range is higher than the second frequency range. The sensor 1622 and the controller 1612 cooperate in a feedback to actively control the frequency response of the multiple frequency vibration absorber 1600 to various frequencies. The FFMC tubes 1608a and 1608b absorb the vibration of the aircraft component and change the frequency response (e.g., reduce the maximum displacement) of the aircraft component by dynamically changing the stiffness of the multiple frequency vibration absorber 1600. For example, closing the valve 1616 increases the stiffness of the FFMC tubes based on increasing resistance to the flow of the working fluid through the FFMC tube. Opening the valve 1616 decreases the stiffness of the FFMC tube based on decreasing resistance to the flow of the working fluid through the FFMC tube.

Figure 18:
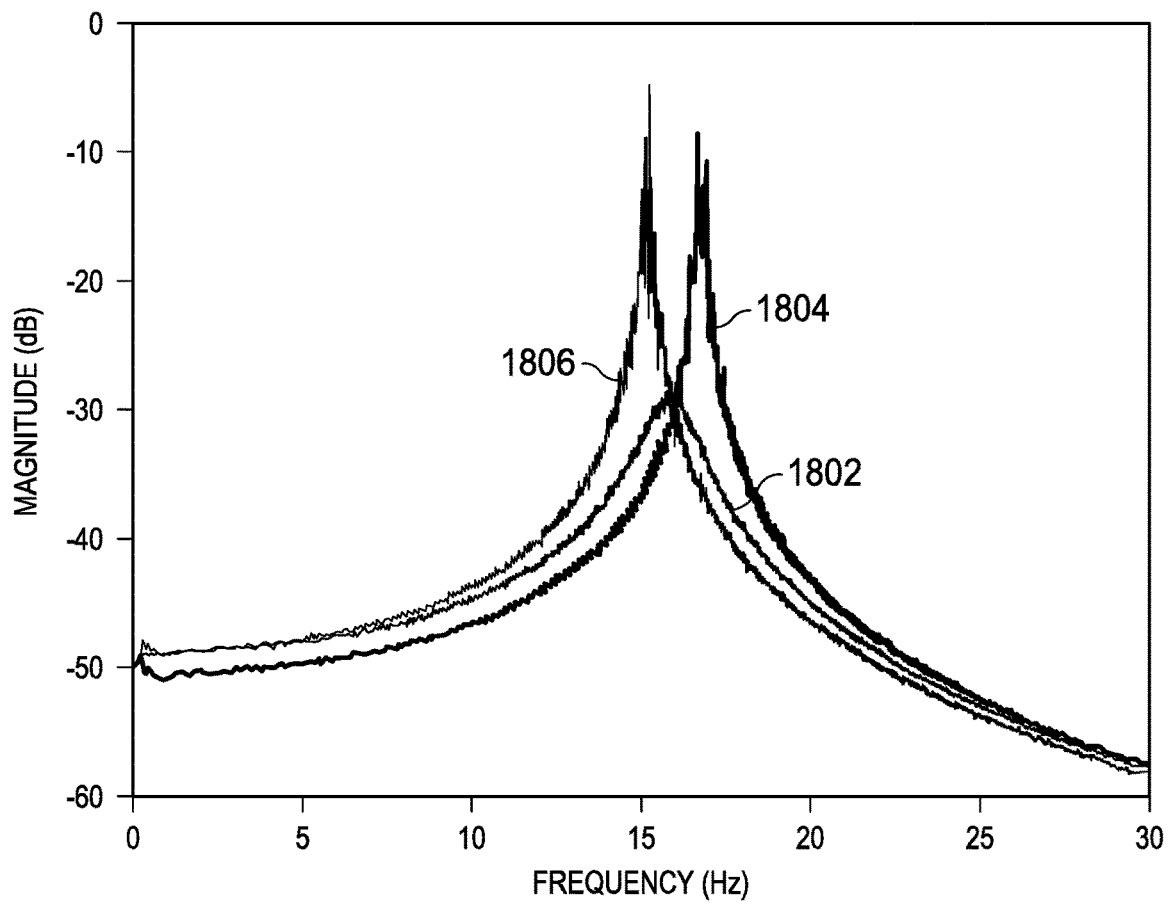

FIG. 18 is a graph of frequency response of the multiple frequency vibration absorber 1600, in accordance with some embodiments of the present disclosure. Curve 1802 illustrates a baseline performance of the multiple frequency vibration absorber 1600, i.e., without any vibration control system. Curve 1806 illustrates the frequency response of the multiple frequency vibration absorber 1600 when the valve 1616 is completely open. Curve 1804 illustrates the frequency response of the multiple frequency vibration absorber 1600 when the valve 1616 is completely closed. These curves show that by opening and closing the valve 1616, the natural frequency of the multiple frequency vibration absorber 1600 can be changed. The natural frequency of the multiple frequency vibration absorber 1600 can be tuned between the values of curves 1804 and 1806 by partially opening the valve 1616. The multiple frequency vibration absorber 1600 can be tuned to absorb a desired frequency by using the valve 1616 to set the natural frequency of the multiple frequency vibration absorber 1600.

Figure 19:
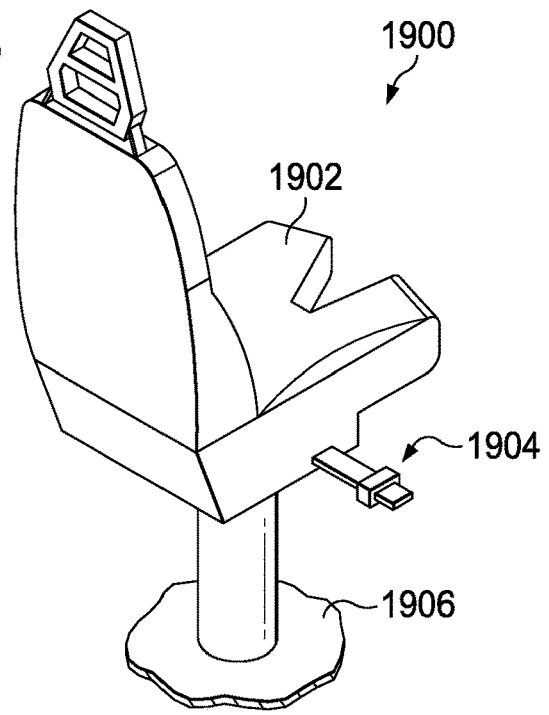

FIG. 19 illustrates a system 1900 in which a multiple frequency vibration absorber is applied to a seat in an aircraft, in accordance with some embodiments of the present disclosure. The system 1900 includes a seat, which is attached to and receives vibrations from an aircraft 1906. A multiple frequency vibration absorber 1904 is attached to the seat 1902. Advantageously, though the aircraft 1906 may generate vibrations, e.g., at a specific frequency, the multiple frequency vibration absorber 1904 is tuned to absorb the vibrations at the specific frequency.

FIGS. 20A, 20B, 20C, 21A, 21B, 22, 23, 24, 25A, 25B, 25C, 26, 27A, 27B, 28A, 28B, and 28C illustrate details of vibration control systems that utilize FFMC tubes to damp vibration of an aircraft wing such as the wing 205 of the tiltrotor aircraft 201 of FIG. 2 and/or the wings 305a and 305b of the jet aircraft 301 of FIG. 3.

Figure 20A:
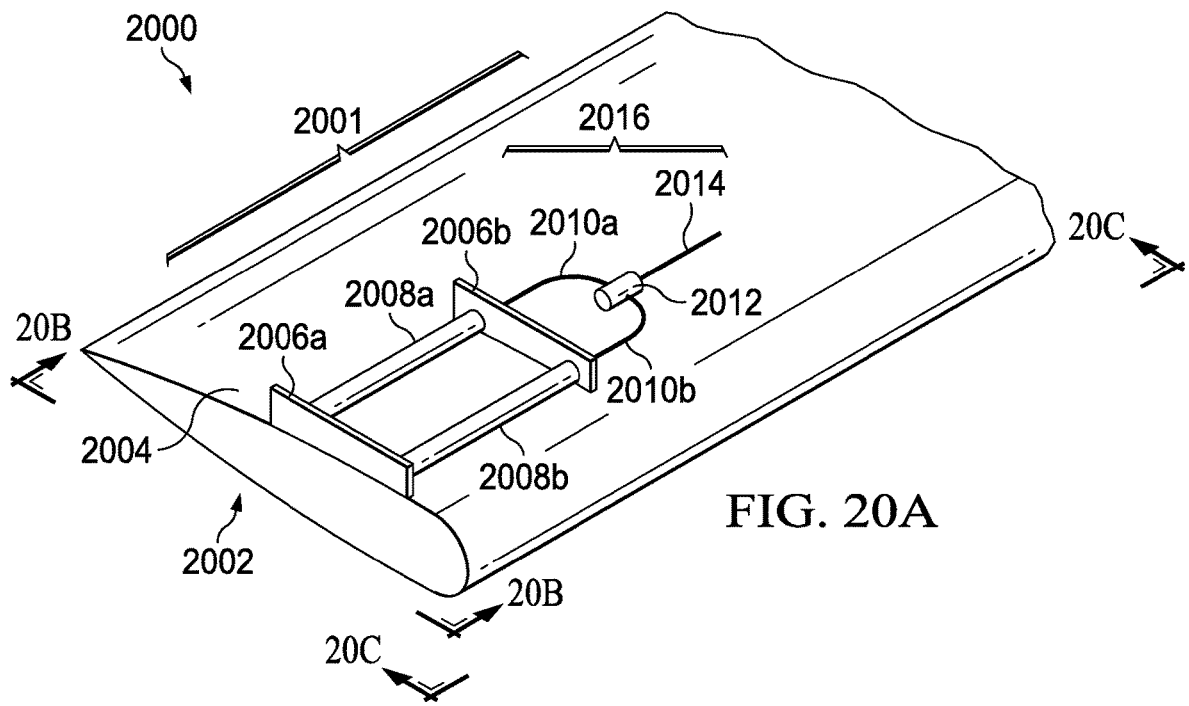
FIGS. 20A, 20B, 20C, 21A, 21B, 22, 23, 24, 25A, 25B, 25C, 26, 27A, 27B, 28A, 28B, and 28C illustrate details of vibration control systems that utilize FFMC tubes to damp vibration of an aircraft wing.
Figure 20B:
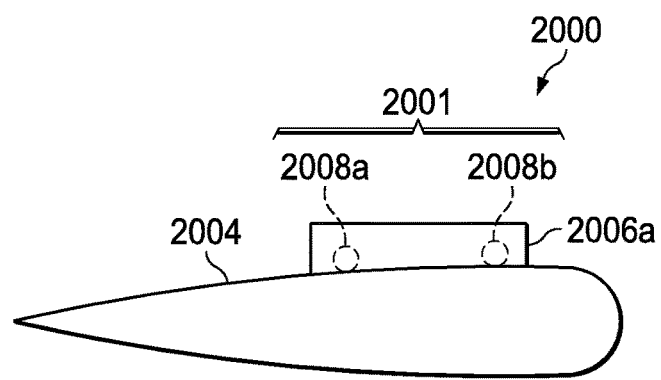
Figure 20C:
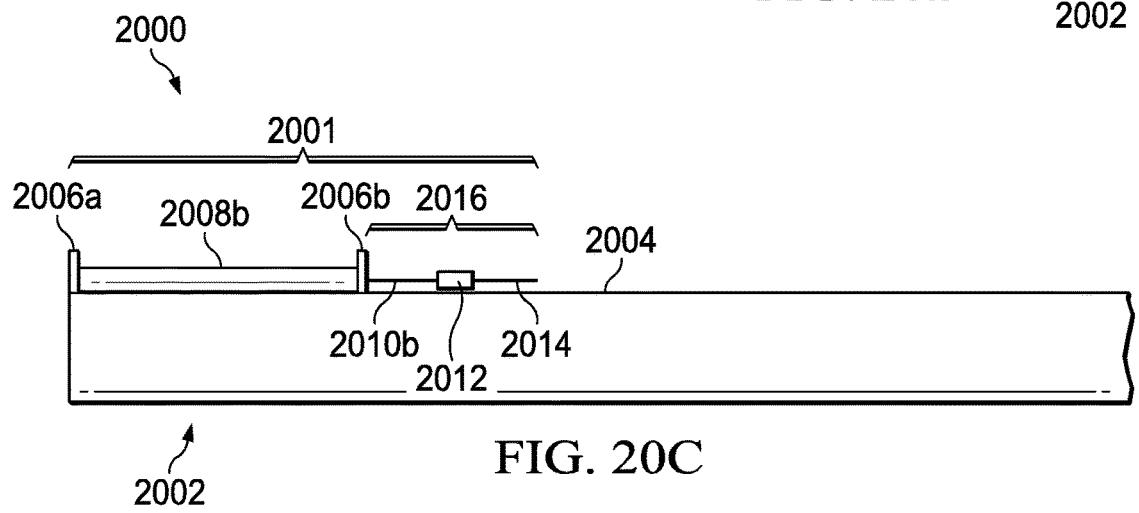

FIGS. 20A, 20B, and 20C illustrate a system 2000 in which a vibration control system 2001 is coupled to an external surface 2004 of an aircraft wing 2002. FIG. 20A is a three-dimensional view of the system 2000. FIG. 20B is a view of the system 2000 from the viewpoint of the arrows labeled "20B" in FIG. 20A. FIG. 20C is a view of the system 2000 from the viewpoint of the arrows labeled "20C" in FIG. 20A. The vibration control system 2001 includes FFMC tubes 2008a and 2008b, attachment plates 2006a and 2006b, and a fluidic circuit 2016. The attachment plates 2006a and 2006b attach the FFMC tubes 2008a and 2008b to the external surface 2004 of the aircraft wing 2002 in a configuration that corresponds to the configuration 1200 of FIGS. 12A and 12B. The attachment plates 2006a and 2006b also couple the FFMC tubes 2008a and 2008b to one another, which can cause the FFMC tubes 2008a and 2008b receive approximately the same strain and therefore produce balanced inertance effects that do not introduce eccentricities in the stiffness provided by the vibration control system 2001. The fluidic circuit 2016 includes conduits 2010a, 2010b, 2014, and valve 2012. The vibration control system 2001 includes FFMC tubes 2008a and 2008b, attachment plates 2006a and 2006b, and a fluidic circuit 2016. Many components of the vibration control system 2001 of FIG. 20 are similar to corresponding components in the vibration control system 800 of FIG. 8; the description of such components is not repeated here only for the sake of brevity. The FFMC tubes 2008a and 2008b in the vibration control system 2001 are operable damp vibrations of the aircraft wing 2002 based on a stiffness of the FFMC tubes 2008a and 2008b, which can be controlled, at least in part, by the setting a position of the valve 2012. In some embodiments, the vibration control system 2001 is passive and the valve 2012 is, e.g., manually operated. In other embodiments, the vibration control system 2001 is active or semi-active and includes a processing unit such as the processing unit 918 of FIG. 9 to actively control damping vibrations of the aircraft wing 2002 via the FFMC tubes 2008a and 2008b based on actuating the valve 2012. While the example of FIGS. 20A, 20B, and 20C illustrate two FFMC tubes coupled to the same side of an aircraft wing, embodiments of the present disclosure are not limited to such. For example, FIGS. 21A and 21B illustrate FFMC tubes coupled to the opposite sides of an aircraft wing.

Figure 21A:
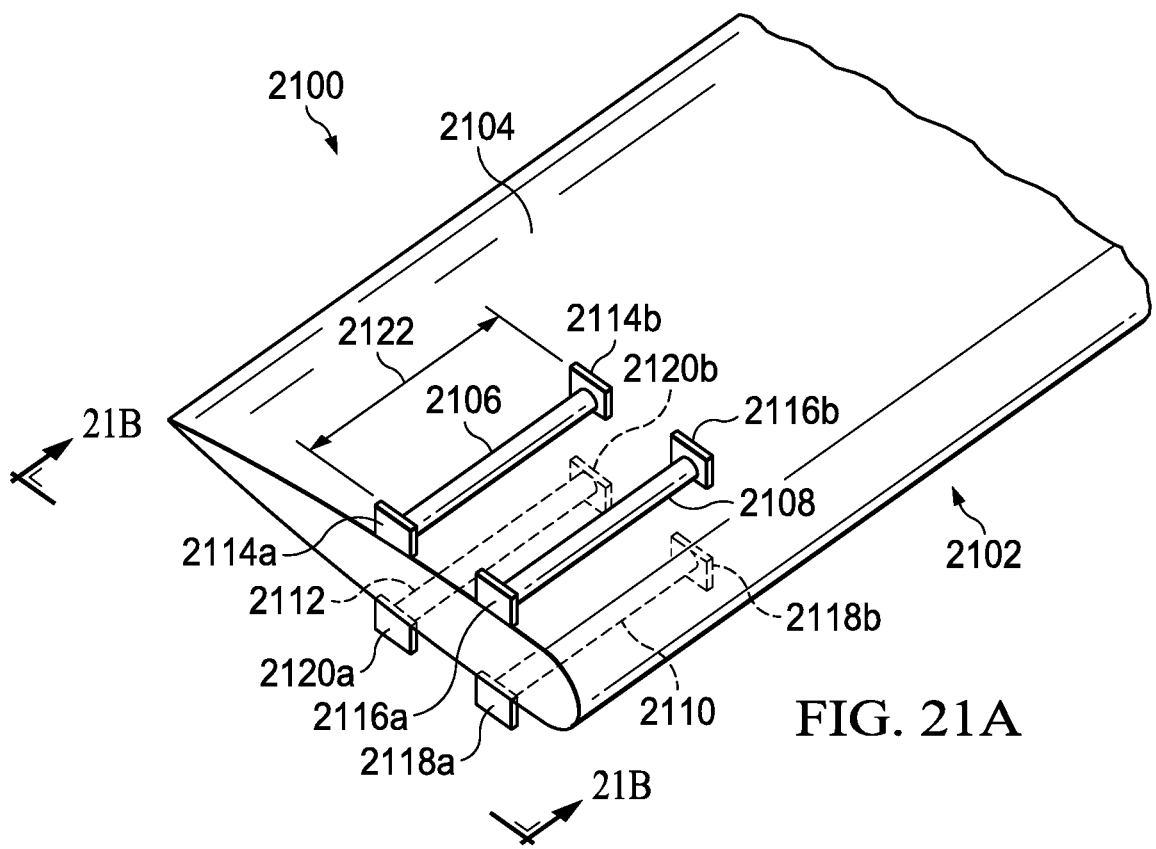
Figure 21B:
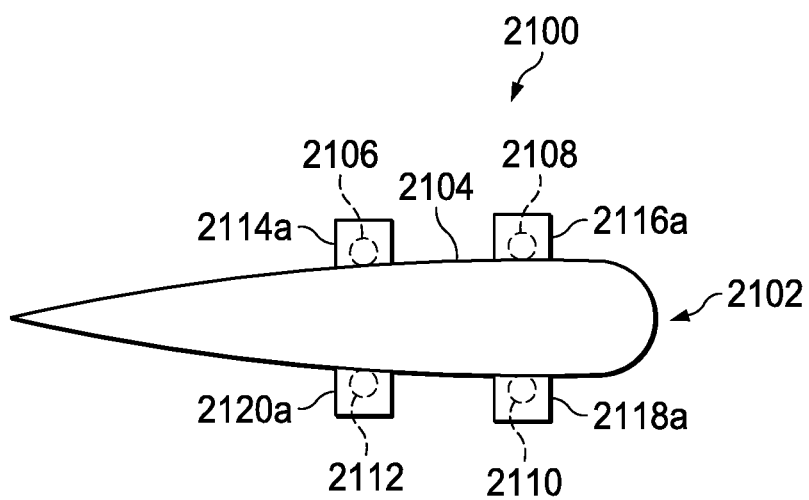

FIGS. 21A and 21B illustrate a system 2100 in which a vibration control system 2101 is coupled to an external surface 2104 of an aircraft wing 2102. FIG. 21A is a three-dimensional view of the system 2100. FIG. 21B is a view of the system 2100 from the viewpoint of the arrows labeled "21B" in FIG. 21A. The vibration control system 2101 includes FFMC tubes 2106, 2108, 2112, and 2110 and attachment plates 2114a, 2114b, 2116a, 2116b, 2118a, 2118b, 2120a, and 2120b, and at least one fluidic circuit (not shown). The attachment plates attach the FFMC tubes to the external surface 2104 of the aircraft wing 2102 in a configuration that corresponds to the configuration 1300 of FIGS. 13A and 13B. The fluidic circuit of the vibration control system 2101 may be configured in various ways. In some embodiments, the fluidic circuit of the vibration control system 2101 includes the components as described with respect to the fluidic circuits of FIG. 10. In other embodiments, the vibration control system 2101 includes two or more fluidic circuits that couple diagonal pairs of the FFMC tubes 2106, 2108, 2110, and 2112 to damp torsional vibrations such as the fluidic circuits 1316 and 1318 as described with respect to the fluidic circuits of FIGS. 13a and 13B. Indeed, any subset or combination of the FFMC tubes 2106, 2108, 2110, and 2112 may be coupled to one another to create one or more fluidic circuits within the vibration control system 2101 according to the teachings of the present disclosure. In some examples, the fluidic circuit may be located outside of the aircraft wing 2102. In other examples, the fluidic circuit may pass though and/or be located inside of the aircraft wing 2102 (i.e., enclosed within the external surface 2104).

The FFMC tubes 2106, 2108, 2110, and 2112 in the vibration control system 2101 are operable to damp vibrations of the aircraft wing 2102 based on a stiffness of the FFMC tubes 2106, 2108, 2112, and 2110, which can be controlled at least in part by the setting a position of a valve in the fluidic circuit. In some embodiments, the vibration control system 2101 is passive and the valve is, e.g., manually operated. In other embodiments, the vibration control system 2101 is active or semi-active and includes a processing unit such as the processing unit 918 of FIG. 9 to actively control absorption of vibrations of the aircraft wing 2002 via the FFMC tubes 2008a and 2008b based on actuating the valve 2012. While the FIGS. 21A and 21B illustrate the vibration control system 2001 coupled to the external surface 2004 of the aircraft wing 2002, embodiments of the present disclosure are not limited to such implementations. For example, in some embodiments, the vibration control system 2001 is coupled to an internal surface of the aircraft wing 2002.

Figure 22:
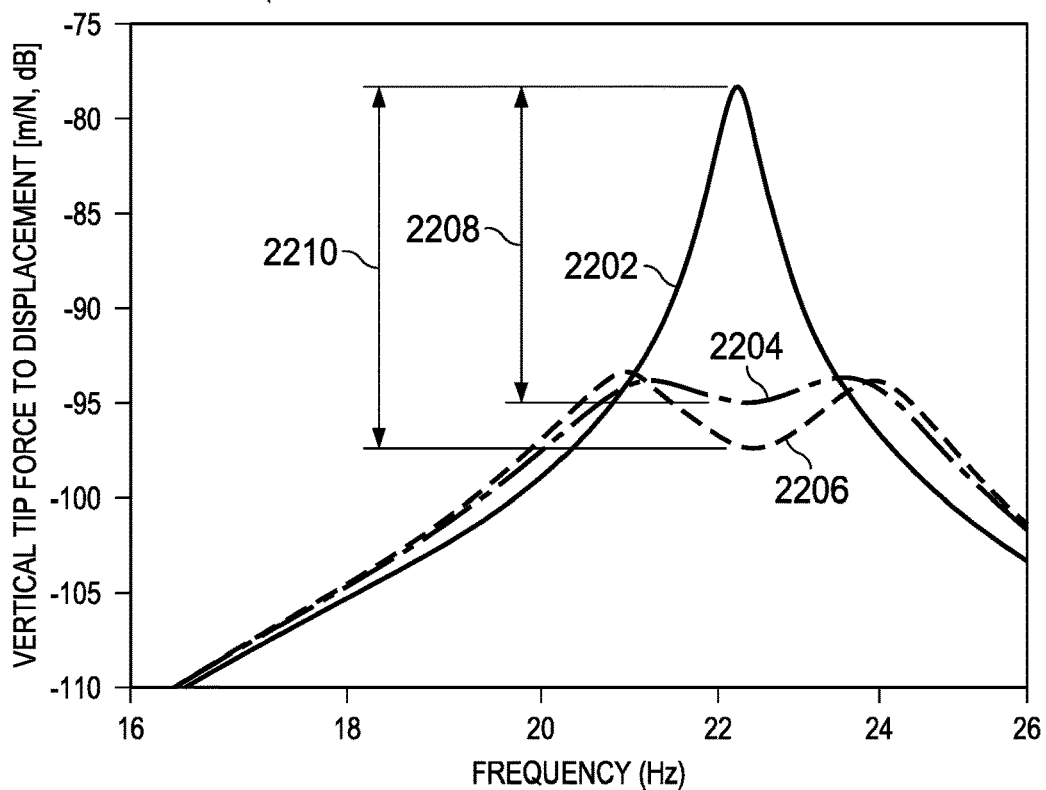
Figure 23:
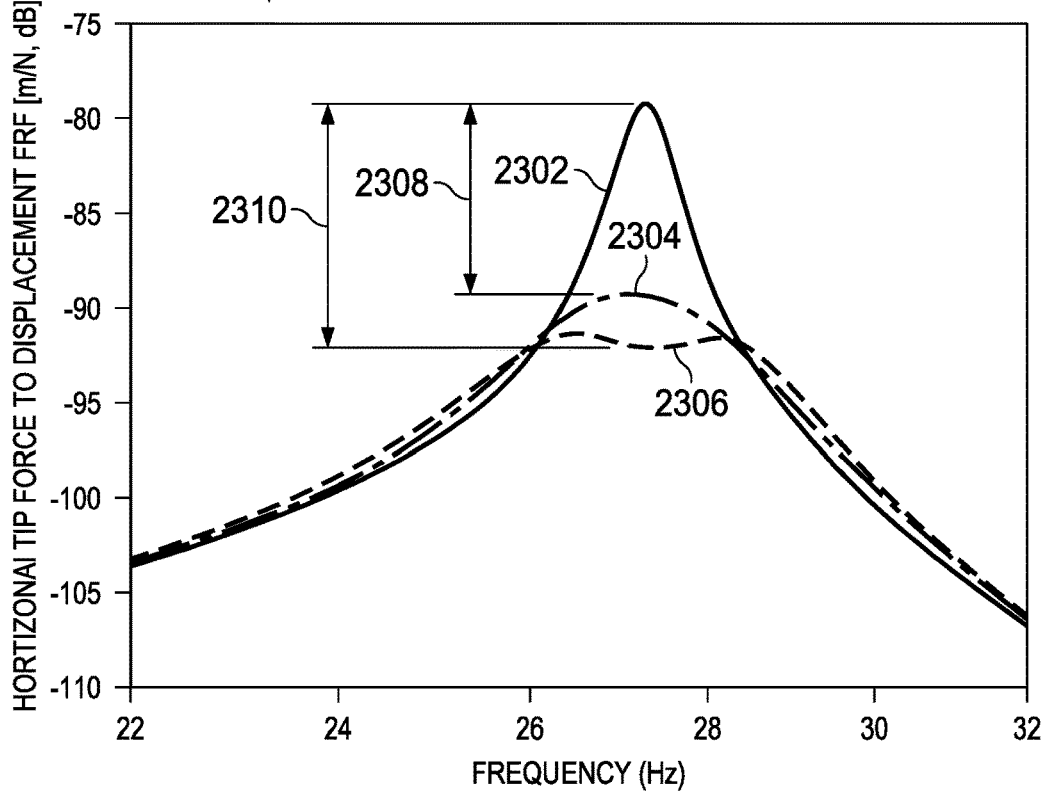
Figure 24:
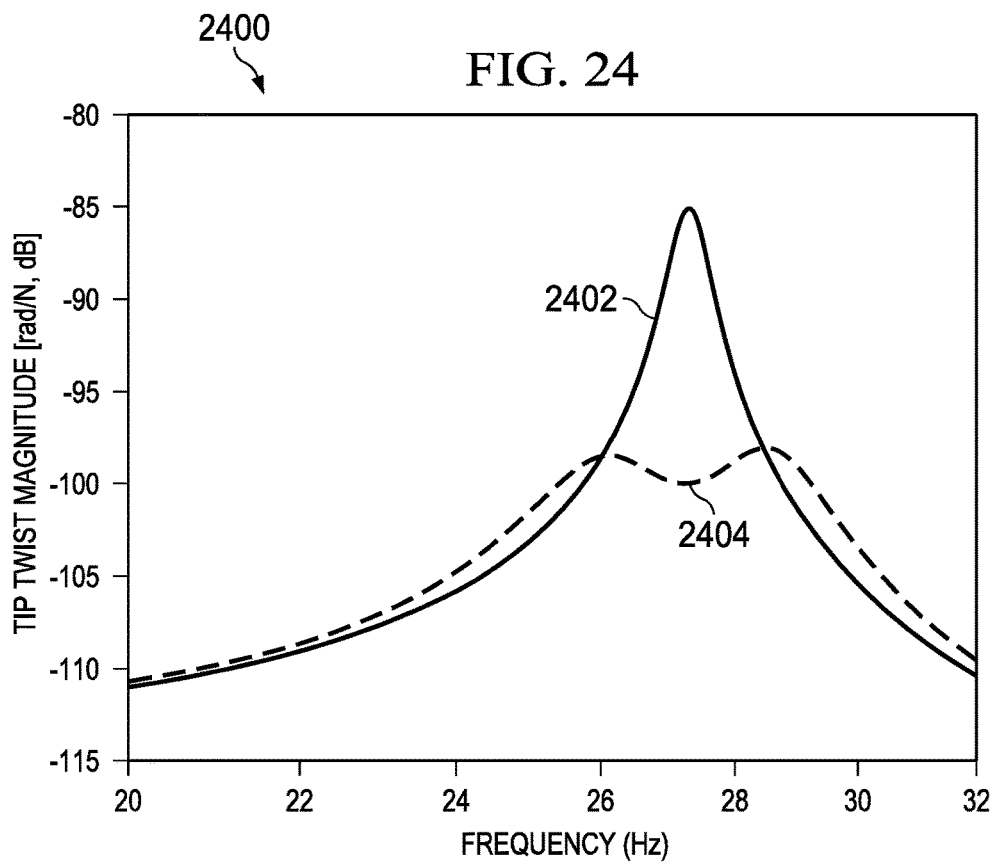

FIGS. 22, 23, and 24 are graphs of displacement per unit force related to an aircraft component such as a wing or empennage. FIG. 22 is a graph 2200 of vertical displacement per unit force, measured in meters per Newton, versus a forcing frequency, measured in Hertz. Each plot illustrates the magnitude of vertical displacement per unit force across a range of frequencies. Curve 2202 illustrates a baseline performance of the aircraft component, i.e., without any vibration control system. Curve 2204 illustrates a performance of the aircraft component with a vibration control system using 10 inch effective length FFMC tubes, which represents an 85% reduction in tip displacement as illustrate by 2208. Curve 2206 illustrates a performance of the aircraft component with a vibration control system 21 inch effective length FFMC tubes, which represents an 88% reduction in tip displacement as illustrate by 2210. FIG. 23 is a graph of horizontal displacement per unit force, measured in meters per Newton, versus a forcing frequency, measured in Hertz. Curve 2302 illustrates a baseline performance of the aircraft component, i.e., without any vibration control system. Curve 2304 illustrates a performance of the aircraft component with a vibration control system using 10 inch effective length FFMC tubes, which represents an 69% reduction in tip displacement as illustrate by 2308. Curve 2306 illustrates a performance of the aircraft component with a vibration control system using 21 inch effective length FFMC tubes, which represents an 77% reduction in tip displacement as illustrate by 2310. FIG. 24 is a graph of torsional displacement per unit force, measured in radians per Newton, versus a forcing frequency, measured in Hertz. Curve 2402 illustrates a baseline performance of the aircraft component, i.e., without any vibration control system. Curve 2404 illustrates a performance of the aircraft component with a vibration control system using 21 inch effective length FFMC tubes. These results illustrate an example of the impact that the vibration control systems of the present disclosure can have on reducing the vibrations of aircraft components.

It is noted that while the examples of FIGS. 20A, 20B, 20C, 21A, and 21B illustrate FFMC tubes coupled to an external surface of an aircraft wing, embodiments of the present disclosure are not limited to such. For example, FIGS. 25A, 25B, and 25C illustrate FFMC tubes located inside an outer mold line of an aircraft wing.

Figure 25A:
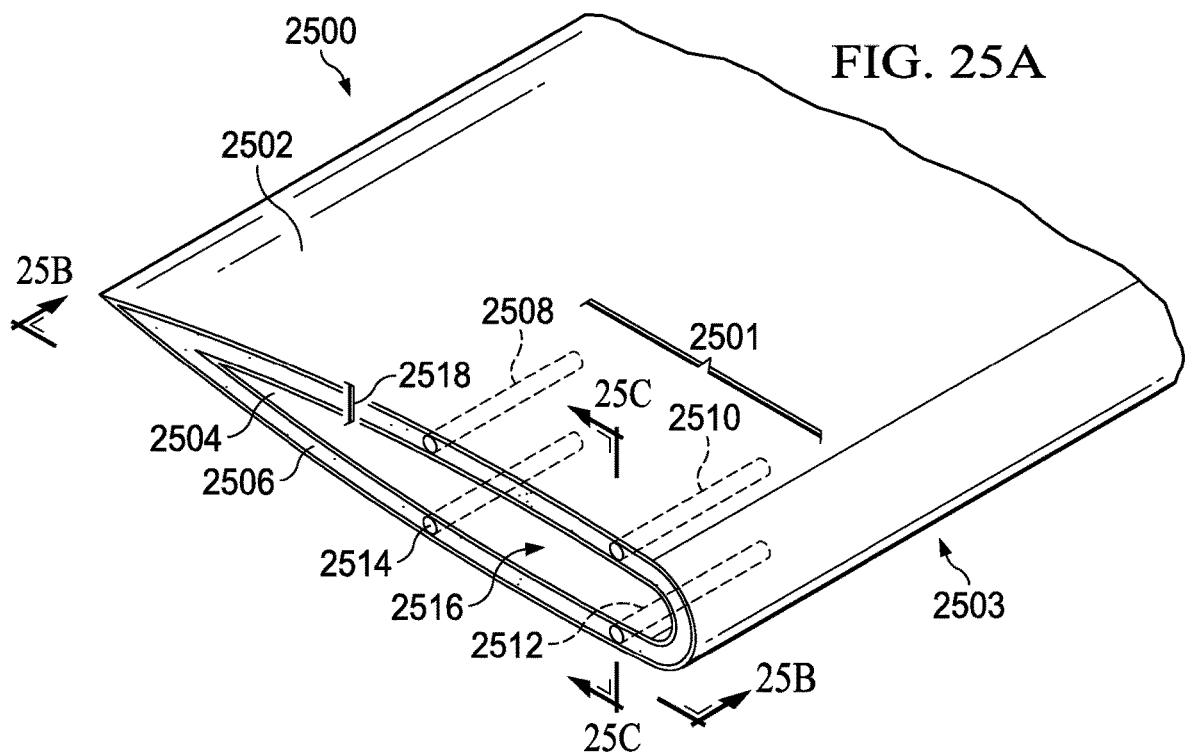
Figure 25B:
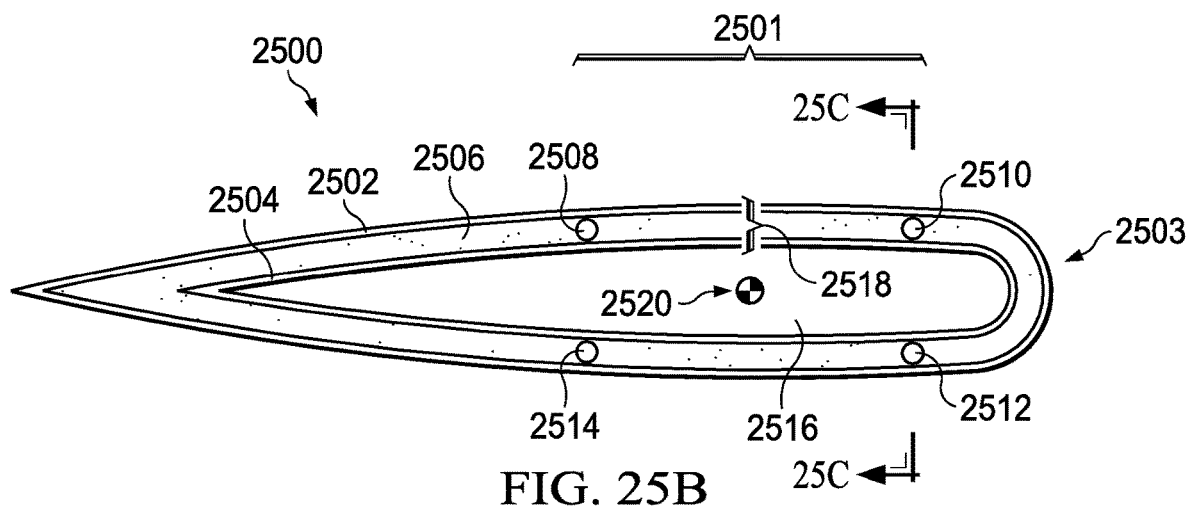
Figure 25C:
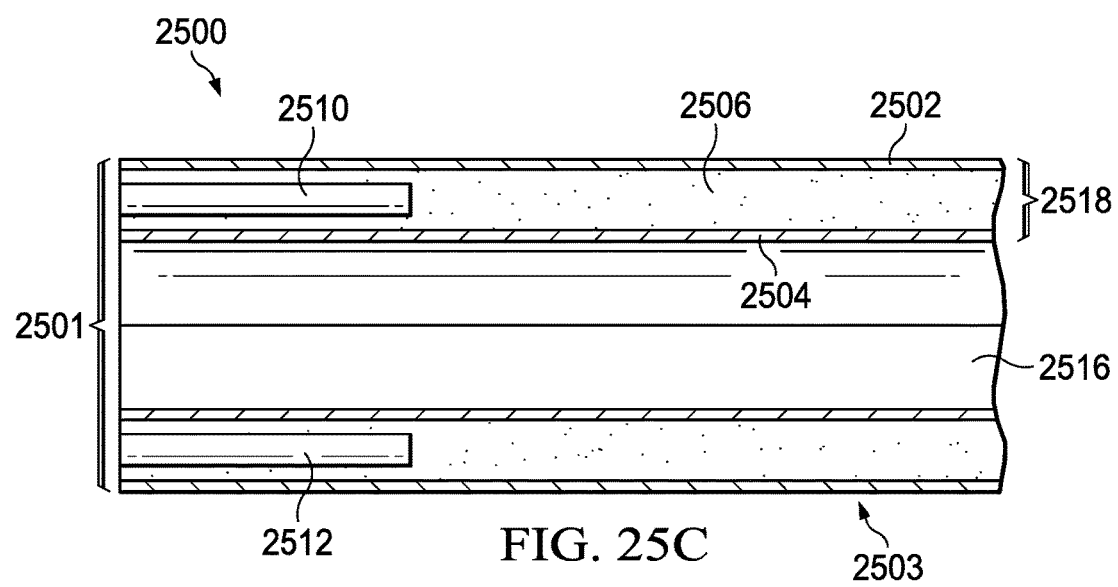

FIGS. 25A, 25B, and 25C illustrate a system 2500 in which a vibration control system 2501 is embedded within a composite material 2518 forming an aircraft wing 2503. FIG. 25A is a three-dimensional view of the system 2500. FIG. 25B is a view of the system 2500 from the viewpoint of the arrows labeled "25B" in FIG. 25A. FIG. 25C is a cross-section of the system 2500 taken along the arrows labeled "25C" in FIG. 25A. The vibration control system 2501 includes FFMC tubes 2508, 2510, 2512, and 2514 and at least one fluidic circuit (not shown) coupling two or more of the FFMC tubes 2508, 2510, 2512, and 2514. The composite material 2518 is a structural load bearing skin that supports aerodynamic loads and defines the outer mold line of the aircraft wing 2503. The composite material 2518 includes a plurality of layers comprising an outer surface 2502, an inner surface 2504, and a fill material 2506 located between the outer surface 2502 and the inner surface 2504. In some examples, the outer surface 2502 and the inner surface 2504 includes carbon fiber sheets, fiberglass sheets, ply weaves, fabric and tape, copper mesh (e.g., to mitigate electrostatic charges), heating elements for deicing, and/or combinations thereof and the fill material 2506 includes a polymer such as a resin, epoxy, combinations thereof, or any other composition. In other examples, the outer surface 2502 and the inner surface 2504 includes metallic sheets and the fill material 2506 includes a honeycomb or foam. The aircraft wing 2503 forms a cavity 2516, which house additional components such as structural elements, wiring, tubing, and the like.

The FFMC tubes 2508, 2510, 2512, and 2514 are embedded within the material 2506 of the composite material 2518 in a configuration that corresponds to the configuration 1300 of FIGS. 13A and 13B. The fluidic circuit of the vibration control system 2501 may be configured in various ways. For example, any subset or combination of the FFMC tubes 2508, 2510, 2512, and 2514 may be coupled to one another to create one or more fluidic circuits within the vibration control system 2505 according to the teachings of the present disclosure. The fluidic circuit can extend though composite material 2518 and into the cavity 2516.

The FFMC tubes 2508, 2510, 2512, and 2514 the vibration control system 2501 are operable to damp vibrations of the aircraft wing 2503 based on a stiffness of the FFMC tubes 2508, 2510, 2512, and 2514. Many components of the vibration control system 2501 are similar to corresponding components described with respect to other embodiments of the present disclosure, such as in the FIGS. 21A and 21B; the description of such components is not repeated here only for the sake of brevity. The vibration control system 2501 is enclosed within the outer mold line of the aircraft wing 2503, which advantageously help to maintain an undisrupted airflow around the aircraft wing 2503 while still providing the damping effects of the vibration control system 2501.

Figure 26:
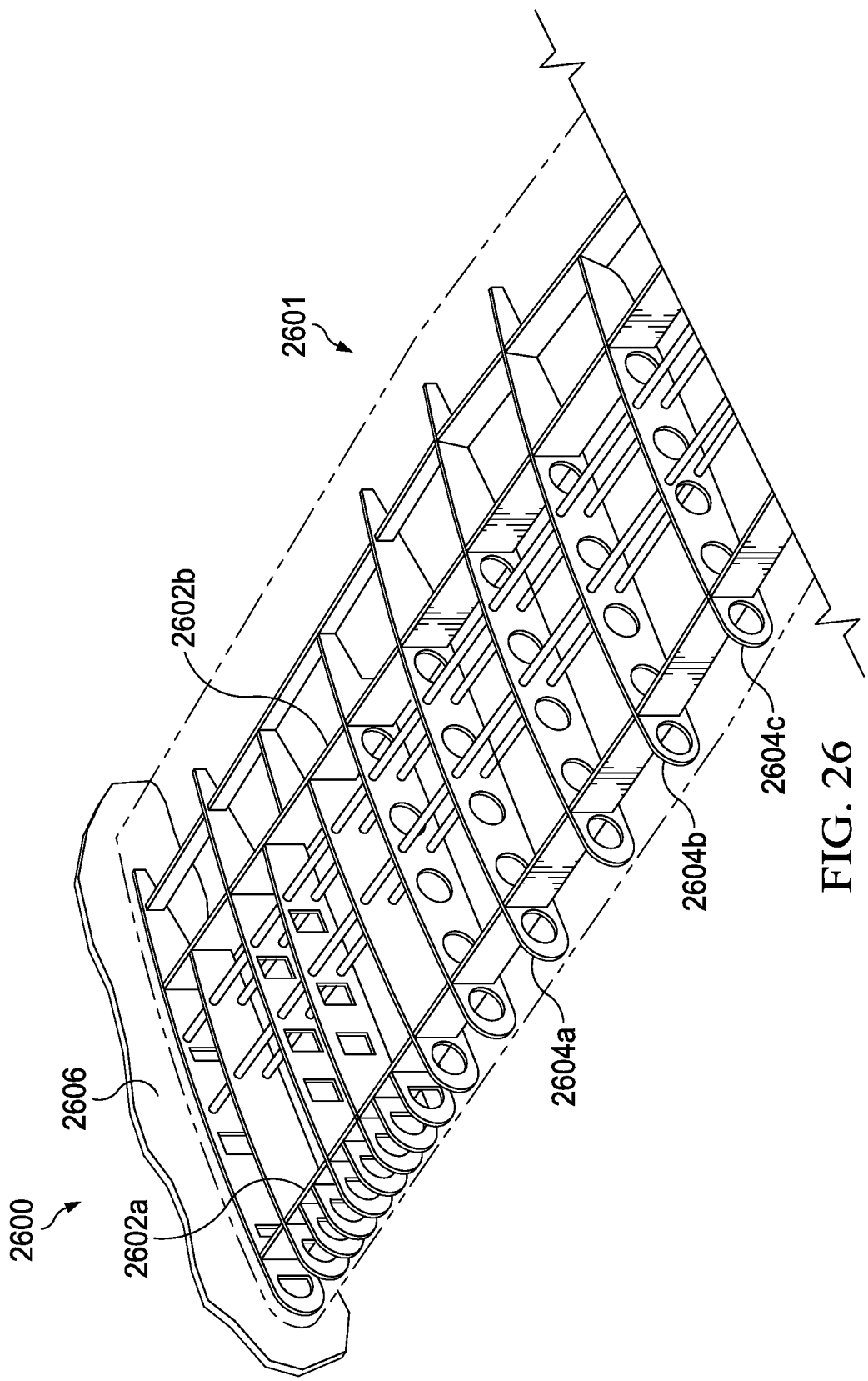

FIG. 26 illustrates a portion of an aircraft 2600. The aircraft 2600 includes a wing 2601, which extends from a fuselage 2606. An exterior surface of the wing is not shown in the FIG. 26 in order to illustrate an internal structure of the wing 2601. A root end of the wing 2601 is attached to the aircraft 2600 via spars (e.g., spars 2602a and 2602b) which support loads from the wing 2601 and transfer the loads to the aircraft via an airframe (not shown). Ribs (e.g., ribs 2604a, 2604b, and 2604c) span between the spars to provide the internal structure of the wing 2601. Each of the spars cantilever from the fuselage 2606. The wing 2601 and internal structural members such as the spars 2602a and 2602b and the ribs 2604a, 2604b, and 2604c may experience vibrations during flight. Advantageously, the vibration control systems of the present disclosure can be integrated directly into internal structural members to help damp such vibrations. Each of the spars 2602a and 2602b may include such vibration control systems, e.g., as described below with respect to the FIGS. 27A and 27B.

Figure 27A:
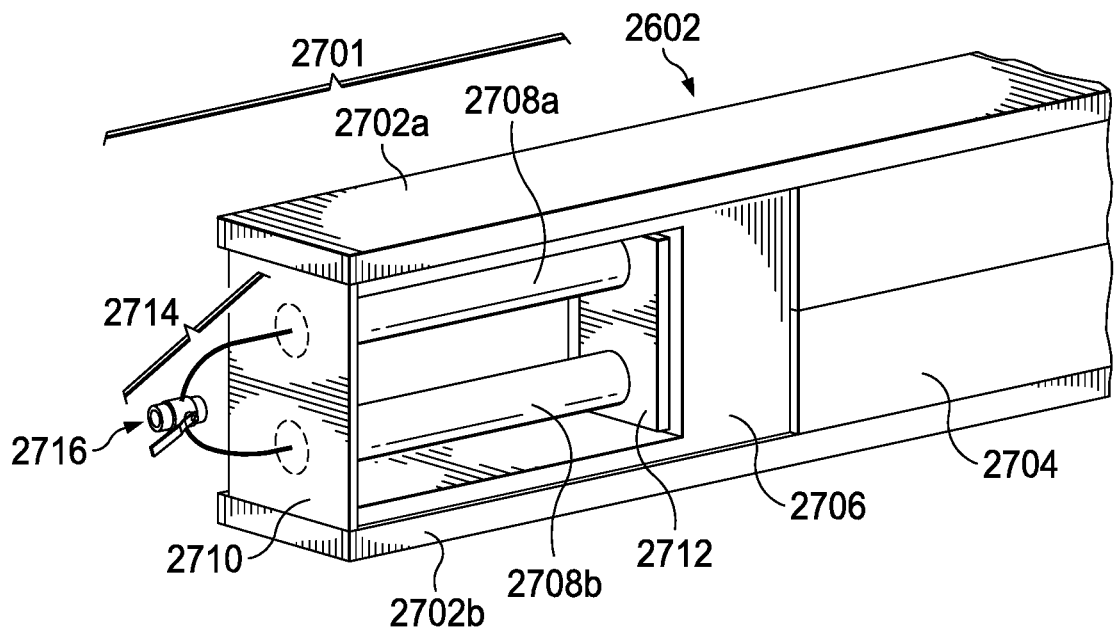
Figure 27B:
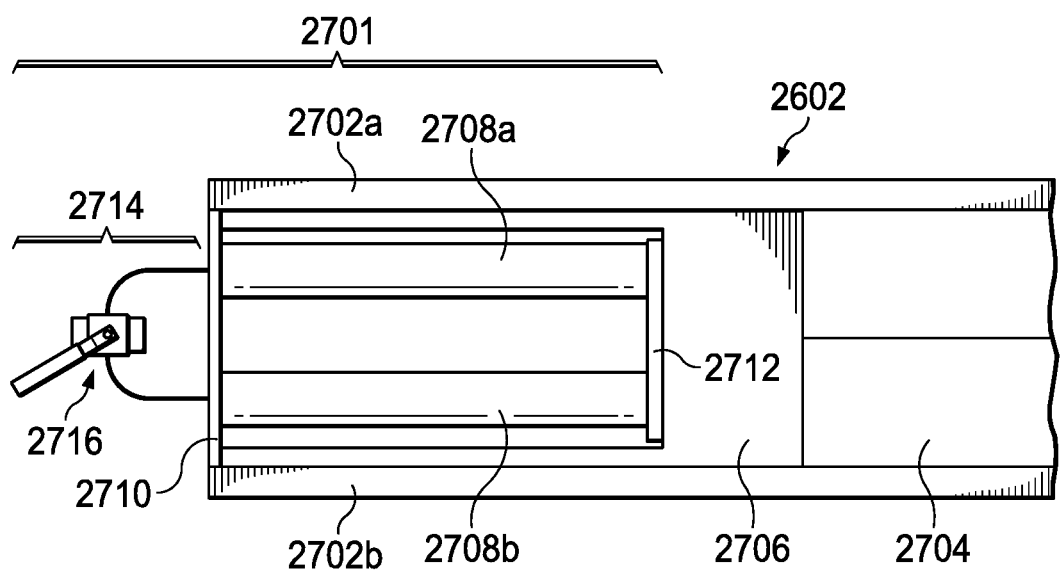

FIGS. 27A and 27B illustrate details of a root end of a spar 2602, which may couple to an airframe and/or a fuselage of an aircraft. FIG. 27A is a three-dimensional view of the root end of a spar 2602. FIG. 27B is a side view of the root end of a spar 2602. The spar 2602 is formed from a composite material a plurality of layers. For example, the spar 2602 includes an upper chord 2702a, a lower chord 2702b, and a web material 2704. A vibration control system 2701 is embedded in cavity formed by a polymeric material 2706 at the root end of the spar 2602. The vibration control system 2701 includes FFMC tubes 2708a and 2708b, attachment plates 2710 and 2712, and a fluidic circuit 2714. The vibration control system 2701 is operable to damp vibrations based on a stiffness of the FFMC tubes 2708a and 2708b, which can be controlled via the fluidic circuit 2714. The FFMC tubes 2708a and 2708b are attached between the attachment plates 2710 and 2712. The attachment plate 2712 may be partially embedder within the polymeric material 2706 or may be attached with mechanical fasteners. The attachment plate 2712 couples the polymeric material 2706 and the FFMC tubes 2708a and 2708b to one another and is configured to transfer vibrations to the FFMC tubes 2708a and 2708b. The attachment plate 2710 is attached to the upper chord 2702a and the lower chord 2702b. The fluidic circuit 2714 extends through the attachment plate 2710 and includes conduits coupling the FFMC tubes 2708a and 2708b to an inertia track via a ball valve 2716. The ball valve 2716 controls the stiffness of the FFMC tubes based on regulating the amount of resistance to flow that the working fluid experiences in the circuit. The ball valve 2716 comprises an orifice and a corresponding barrier coupled to the orifice. The barrier is movable between a first position to completely obstruct the orifice, a second position to completely open the orifice, and a third position between the first position and the second position. In other embodiments, the ball valve 2716 may be replaced by a different type of valve.

Figure 28A:
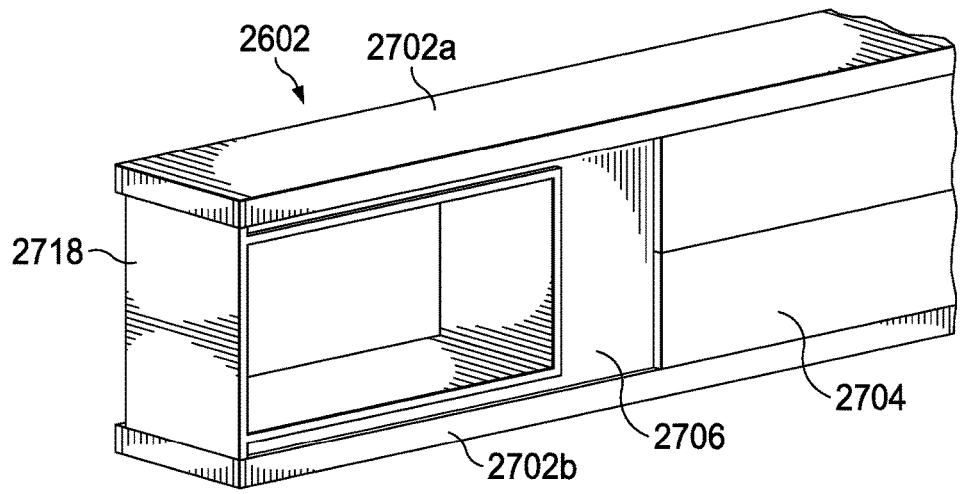
Figure 28B:
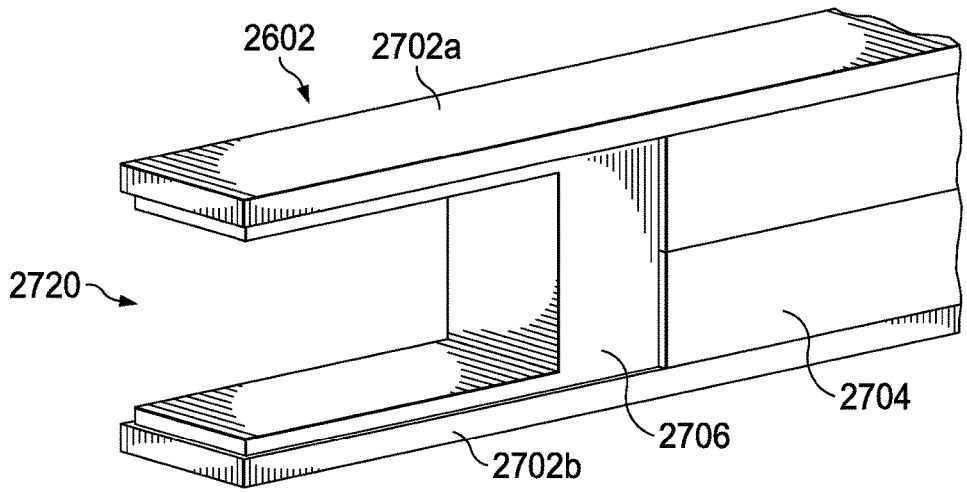
Figure 28C:
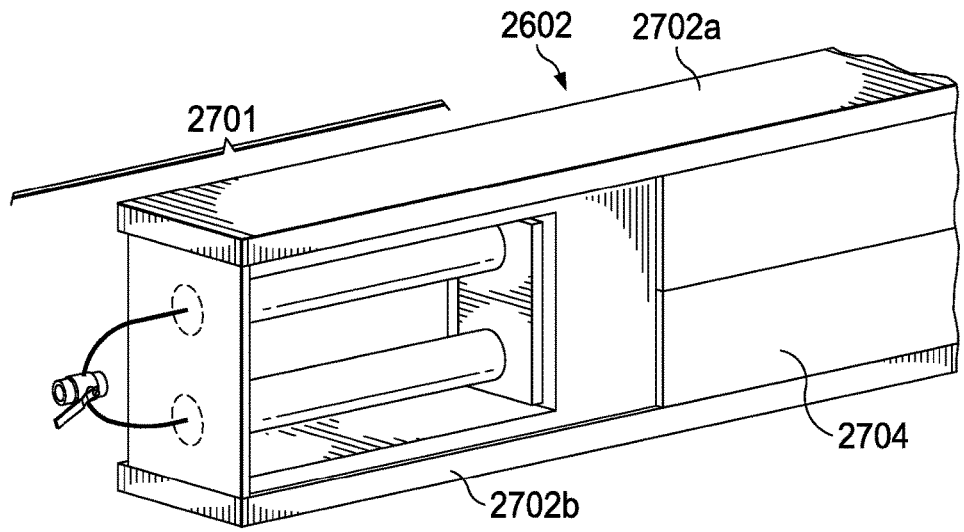

FIGS. 28A, 28B, and 28C illustrate an example method of fabricating the spar 2602. FIG. 28A illustrates the spar 2602 having the material for the upper chord 2702a, the lower chord 2702b, the web material 2704 assembled. A mandrel 2718 is in place between the upper chord 2702a and the lower chord 2702b. With the mandrel 2718 in place, the polymeric material 2706 can then be added to the spar. For example, a liquid resin or epoxy may be poured into the stack up of materials forming the spar 2602 and allowed to cure or set with the mandrel 2718 in place. After the polymeric material 2706 has solidified, the mandrel 2718 is removed, as is illustrated in FIG. 28B. The space previously occupied by the mandrel 2718 forms a cavity 2720 in which the vibration control system 2701 is finally attached.

It is noted that any one or more of the embodiments of FIGS. 20A, 20B, 20C, 21A, 21B, 25A, 25B, 25C, 26, 27A, 27B, 28A, 28B, and/or 28C may include or access a processing unit (see, e.g., processing unit 918 of FIG. 9) to actively control damping vibrations of the aircraft wing via FFMC tubes.

FIGS. 29A, 29B, 29C, 30A, 30B, 31A, 31B, 32A, and 32B illustrate details of vibration control systems that utilize FFMC tubes to damp vibration of an aircraft empennage such as the empennage 111 of the Rotorcraft 101 of FIGS. 1A and 1B, the empennage 213 of the tiltrotor aircraft 201 of FIG. 2, and/or the empennage 313 of the jet aircraft 301 of FIG. 3. Each of the vibration control systems described with respect to the FIGS. 29A, 29B, 29C, 30A, 30B, 31A, 31B, 32A, and 32B can include the . . . .

FIGS. 29A, 29B, and 29C illustrate a system 2900 in which a vibration control system 2901 is coupled to an external surface 2902 of an aircraft empennage 2903 and damps vibrations of the aircraft empennage 2903. FIG. 29A is a three-dimensional view from above the system 2900. FIG. 29b is a three-dimensional view from below the system 2900. FIG. 29C is a front view of the system 2900. The aircraft empennage 2903 includes internal ribs 2904 and intercostal members 2908, which support an external surface 2902. The intercostal members 2908 between adjacent ones of the internal ribs 2904.

The vibration control system 2901 includes FFMC tubes 2906a, 2906b, 2906c, and 2906d and fluidic circuits 2910 and 2912. Attachment plates attach each of the FFMC tubes 2906a, 2906b, 2906c, and 2906d to the external surface 2902 of the aircraft empennage 2903 in a configuration that corresponds to the configuration 1300 of FIGS. 13A and 13B. The fluidic circuit of the vibration control system 2901 may be configured in various ways. In some embodiments, the fluidic circuit of the vibration control system 2901 includes the components as described with respect to the fluidic circuits of FIG. 10. In other embodiments, the vibration control system 2901 includes two or more fluidic circuits that couple diagonal pairs of the FFMC tubes 2906a, 2906b, 2906c, and 2906d to counteract torsional vibrations such as the fluidic circuits 1316 and 1318 as described with respect to the fluidic circuits of FIGS. 13a and 13B. Indeed, any subset or combination of the FFMC tubes 2906a, 2906b, 2906c, and 2906d may be coupled to one another to create one or more fluidic circuits within the vibration control system 2901 according to the teachings of the present disclosure. In some examples, the fluidic circuit may be located outside of the aircraft empennage 2903. In other examples, the fluidic circuit may pass though and/or be located inside of the aircraft empennage 2903 (i.e., enclosed within the external surface 2902).

The FFMC tubes 2906a, 2906b, 2906c, and 2906d in the vibration control system 2901 are operable to damp vibrations of the aircraft empennage 2903 based on a stiffness of the FFMC tubes 2906a, 2906b, 2906c, and 2906d, which can be controlled at least in part by the setting a position of a valve in each of the fluidic circuits 2910 and 2912. In some embodiments, the vibration control system 2901 is passive and the valve is, e.g., manually operated. In other embodiments, the vibration control system 2901 is active or semi-active and includes a processing unit, such as the processing unit 918 of FIG. 9, to actively control absorption of vibrations of the aircraft empennage 2903 via the FFMC tubes 2906a, 2906b, 2906c, and 2906d based on actuating a valve.

Figure 30A:
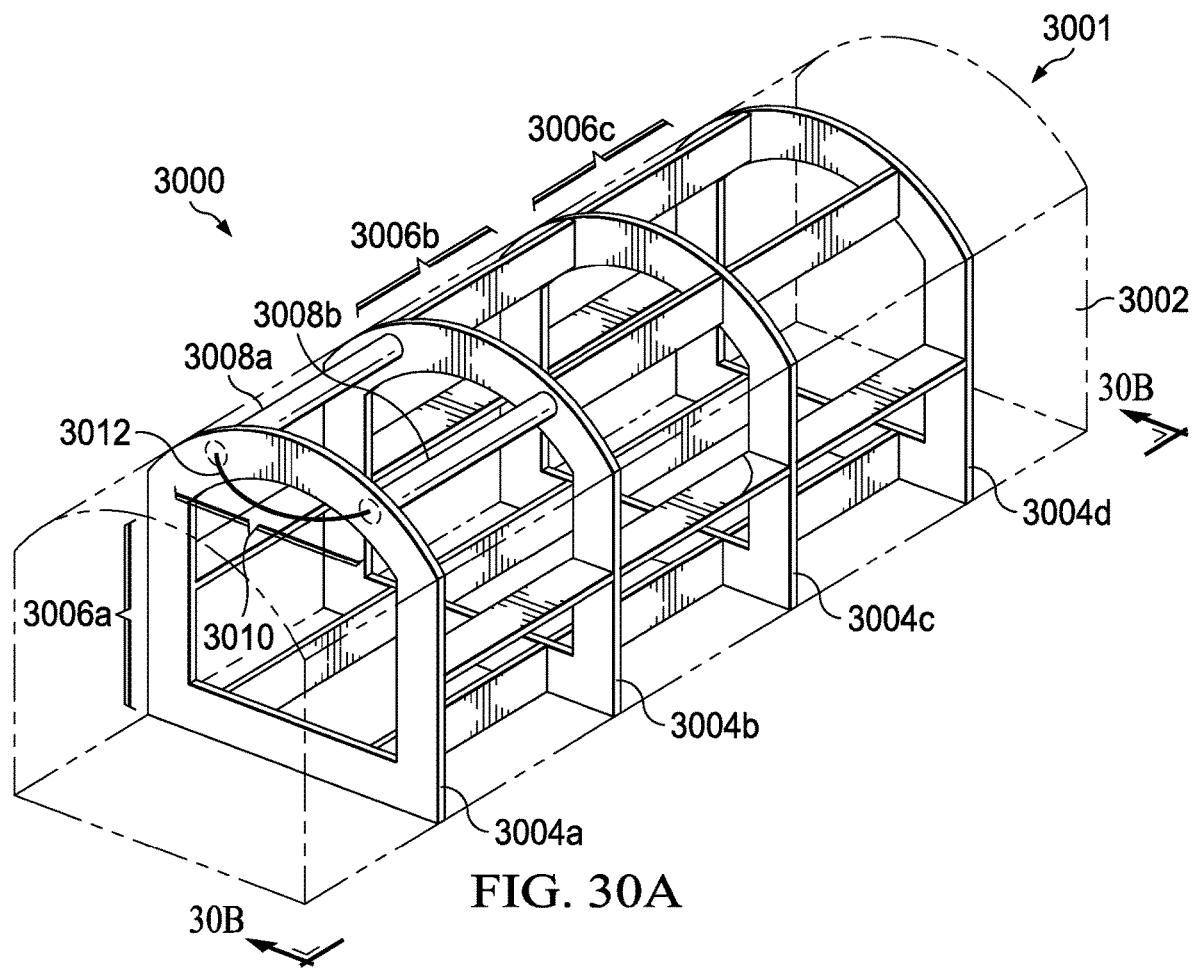
Figure 30B:
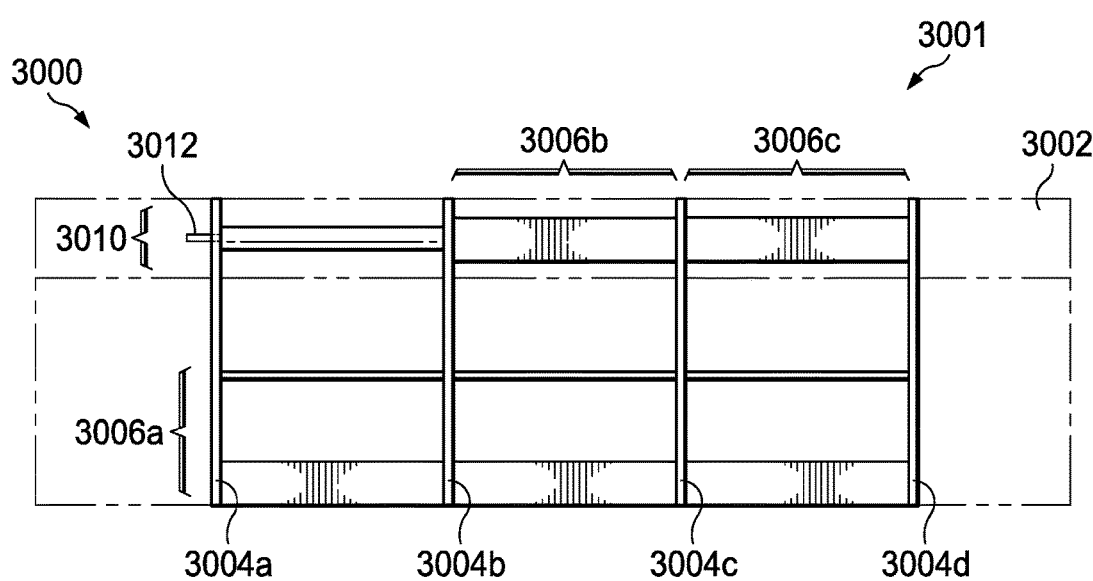

FIGS. 30A and 30B illustrate a system 3000 in which a vibration control system 3010 spans between internal ribs of an aircraft empennage 3001 and is operable to damp vibrations of the aircraft empennage 3008. FIG. 30A is a three-dimensional view of the system 3000. FIG. 30B is a view of the system 3000 from the viewpoint of the arrows labeled "30B" in FIG. 30A. The aircraft empennage 3001 includes internal ribs 3004a, 3004b, 3004c, and 3004d and intercostal members 3006a, 3006b, and 3006c, which support an external surface 3002. The intercostal members 3006a, 3006b, and 3006c span between adjacent ones of the internal ribs 3004a, 3004b, 3004c, and 3004d. The vibration control system 3010 includes FFMC tubes 3008a and 3008b and a fluidic circuit 3012 fluidically coupling the FFMC tubes 3008a and 3008b. The FFMC tubes 3008a and 3008b are attached between the internal ribs 3004a and 3004b. The FFMC tubes 3008a and 3008b are operable to damp vibrations of the aircraft empennage 3001 based on a stiffness of the FFMC tubes 3008a and 3008b, which can be controlled at least in part by the setting a position of a valve in the fluidic circuits and 3012. In some embodiments, the vibration control system 3010 is passive and the valve is, e.g., manually operated. In other embodiments, the vibration control system 3010 is active or semi-active and includes a processing unit, such as the processing unit 918 of FIG. 9, to actively control absorption of vibrations of the aircraft empennage 3001 via the FFMC tubes 3008a and 3008b based on actuating the valve.

Figure 31A:
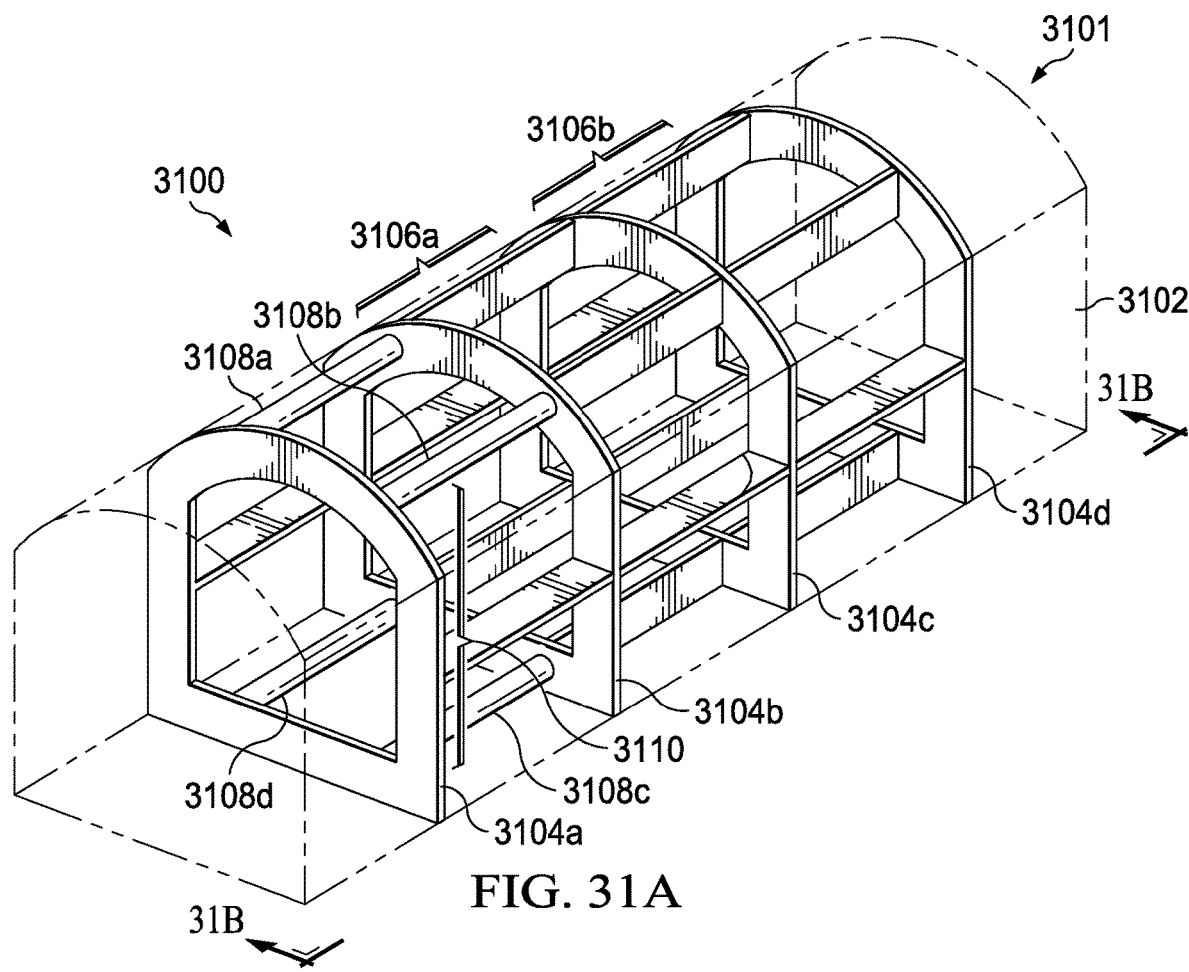
Figure 31B:
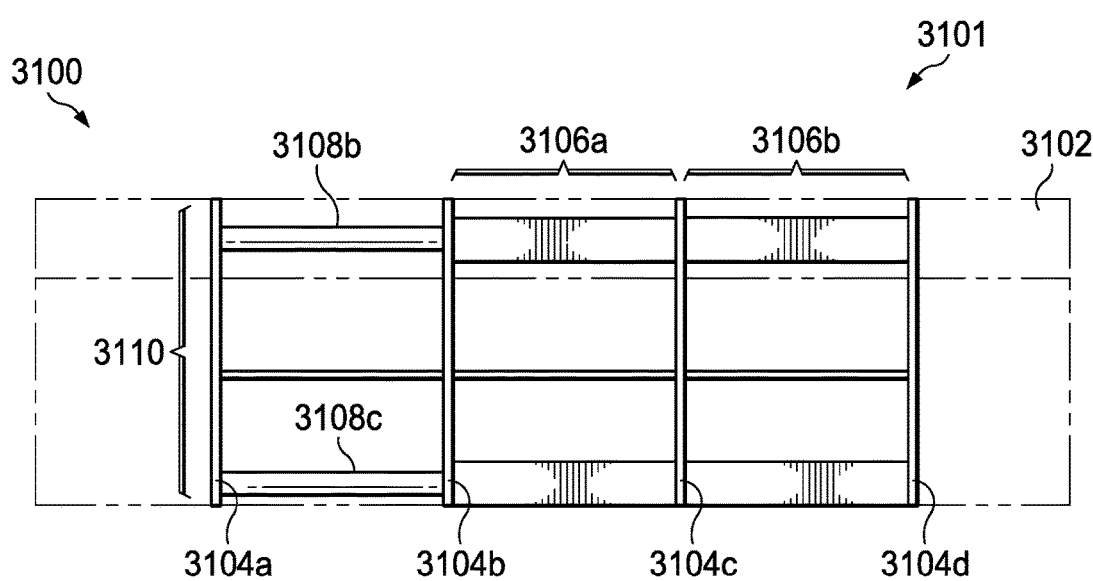

FIGS. 31A and 31B illustrate a system 3100 in which a vibration control system 3110 spans between internal ribs of an aircraft empennage 3101 and is operable to damp vibrations of the aircraft empennage 3108. FIG. 31A is a three-dimensional view of the system 3100. FIG. 31B is a view of the system 3100 from the viewpoint of the arrows labeled "31B" in FIG. 31A. The aircraft empennage 3101 includes internal ribs 3104a, 3104b, 3104c, and 3104d and intercostal members 3106a and 3106b, which support an external surface 3102. The intercostal members 3106a and 3106b span between adjacent ones of the internal ribs 3104b, 3104c, and 3104d. The vibration control system 3110 includes FFMC tubes 3108a, 3108b, 3108c, and 3108d and one or more fluidic circuit (not shown) fluidically coupling the FFMC tubes 3108a, 3108b, 3108c, and 3108d. The FFMC tubes 3108a, 3108b, 3108c, and 3108d are attached between the internal ribs 3104a and 3104b.

The FFMC tubes 3108a, 3108b, 3108c, and 3108d are operable to damp vibrations of the aircraft empennage 3101 based on a stiffness of the FFMC tubes 3108a, 3108b, 3108c, and 3108d, which can be controlled at least in part by the setting a position of a valve in the one or more fluidic circuits. In the configuration illustrated in FIGS. 31A and 31B, the FFMC tubes 3108a, 3108b, 3108c, and 3108d may be utilized to counteract vertical, horizontal, and/or torsional vibrations. The one or more fluidic circuit of the vibration control system 3110 may be configured in various ways. In some embodiments, the one or more fluidic circuit of the vibration control system 3110 includes the components as described with respect to the fluidic circuits of FIG. 10, e.g., to counteract a combination of vertical, horizontal, and/or torsional vibrations. In other embodiments, the vibration control system 3110 includes two or more fluidic circuits that couple diagonal pairs of the FFMC tubes 3108a, 3108b, 3108c, and 3108d to primarily counteract torsional vibrations such as the fluidic circuits 1316 and 1318 as described with respect to the fluidic circuits of FIGS. 13A and 13B. Indeed, any subset or combination of the FFMC tubes 3108a, 3108b, 3108c, and 3108d may be coupled to one another to create one or more fluidic circuits within the vibration control system 3110 according to the teachings of the present disclosure. In some embodiments, the vibration control system 3110 is passive and the valve is, e.g., manually operated. In other embodiments, the vibration control system 3110 is active or semi-active and includes a processing unit, such as the processing unit 918 of FIG. 9, to actively control absorption of vibrations of the aircraft empennage 3101 via the FFMC tubes 3108a, 3108b, 3108c, and 3108d based on actuating the valve.

Figure 32A:
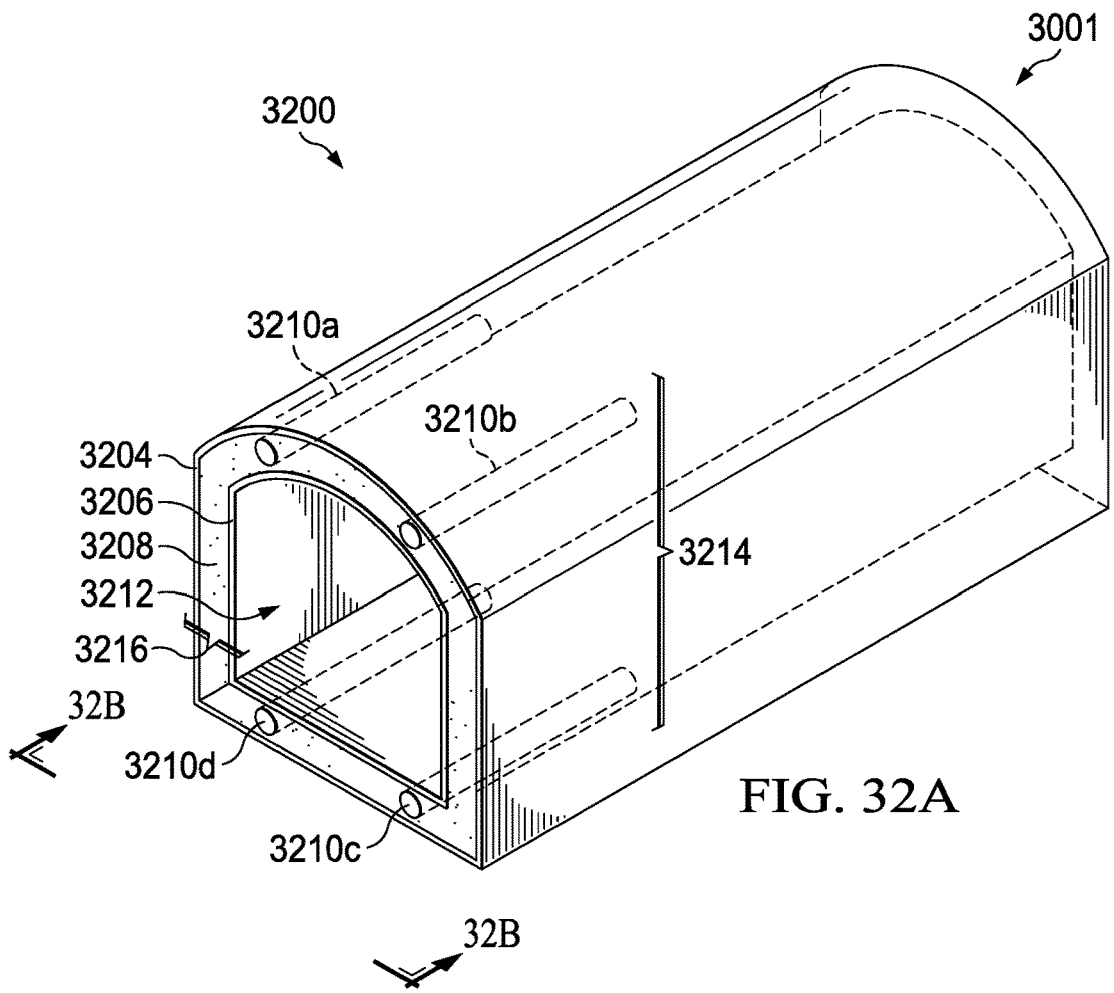
Figure 32B:
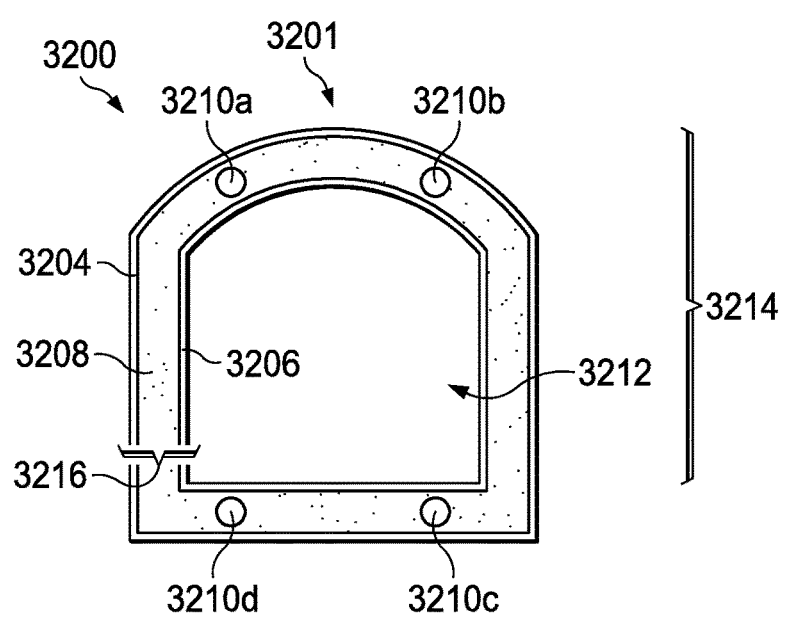

FIGS. 32A and 32B illustrate a system 3200 in which a vibration control system 3214 is embedded within a composite material 3216 forming an aircraft empennage 3201 and is operable to damp vibrations of the aircraft empennage 3201. FIG. 32A is a three-dimensional view of the system 3200. FIG. 32B is a view of the system 3200 from the viewpoint of the arrows labeled "32B" in FIG. 32A. The aircraft empennage 3201 includes internal ribs 3204a, 3204b, 3204c, and 3204d and intercostal members 3206a and 3206b, which support an external surface 3202. The intercostal members 3206a and 3206b span between adjacent ones of the internal ribs 3204b, 3204c, and 3204d. The vibration control system 3210 includes FFMC tubes 3210a, 3210b, 3210c, and 3210d and one or more fluidic circuit (not shown) fluidically coupling the FFMC tubes 3210a, 3210b, 3210c, and 3210d. The composite material 3216 is a structural load bearing skin that supports aerodynamic loads and defines the outer mold line of the aircraft empennage 3201. The composite material 3216 comprises an outer surface 3204, an inner surface 3206, and a fill material 3208 located between the outer surface 3204 and the inner surface 3206. In some examples, the outer surface 3204 and the inner surface 3206 includes carbon fiber sheets and the fill material 3208 includes a polymer such as a resin, epoxy, or any other composition. In other examples, the outer surface 3204 and the inner surface 3206 includes metallic sheets and the fill material 3208 includes a honeycomb or foam. The aircraft empennage 3201 forms a cavity 3212, which may house additional components such as structural elements, wiring, tubing, and the like.

The FFMC tubes 3208a, 3208b, 3208c, and 3208d are operable to damp vibrations of the aircraft empennage 3201 based on a stiffness of the FFMC tubes 3208a, 3208b, 3208c, and 3208d, which can be controlled at least in part by the setting a position of a valve in the one or more fluidic circuits. In the configuration illustrated in FIGS. 32A and 32B, the FFMC tubes 3208a, 3208b, 3208c, and 3208d may be utilized to counteract vertical, horizontal, and/or torsional vibrations. The one or more fluidic circuit of the vibration control system 3210 may be configured in various ways. In some embodiments, the one or more fluidic circuit of the vibration control system 3210 includes the components as described with respect to the fluidic circuits of FIG. 10, e.g., to counteract a combination of vertical, horizontal, and/or torsional vibrations. In other embodiments, the vibration control system 3210 includes two or more fluidic circuits that couple diagonal pairs of the FFMC tubes 3208a, 3208b, 3208c, and 3208d to primarily counteract torsional vibrations such as the fluidic circuits 1326 and 1328 as described with respect to the fluidic circuits of FIGS. 13A and 13B. Indeed, any subset or combination of the FFMC tubes 3208a, 3208b, 3208c, and 3208d may be coupled to one another to create one or more fluidic circuits within the vibration control system 3210 according to the teachings of the present disclosure. The fluidic circuit may extend though composite material 3216 and into the cavity 3212. In some embodiments, the vibration control system 3210 is passive and the valve is, e.g., manually operated. In other embodiments, the vibration control system 3210 is active or semi-active and includes a processing unit, such as the processing unit 918 of FIG. 9, to actively control absorption of vibrations of the aircraft empennage 3201 via the FFMC tubes 3208a, 3208b, 3208c, and 3208d based on actuating the valve. Each of the vibration control system 3214 is enclosed within the outer mold line of the aircraft empennage 3201, which advantageously help to maintain an undisrupted airflow around the aircraft empennage 3201 while still providing the damping effects of the vibration control system 3214.

Several embodiments of the present disclosure utilize a certain number of members, such as FFMC tubes, fluidic circuits, vibration control systems, plates, spars, processing units, attachment mechanisms, and the like. However, embodiments of the present disclosure are not limited to the specific number of members in the illustrated embodiments. The number of members can vary between different embodiments. For example, some embodiments may be implemented using more, less, and/or other member than those illustrated in the Figures. Moreover, some embodiments may consolidate two or more of the members into a single member. In addition, several embodiments of the present disclosure refer to and/or show fasteners. Such fasteners are inclusive of screws, nuts, bolts, welds or any other mechanical fasteners for attaching two or more components to one another.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft comprising:
an aircraft component;
a sensor operable to detect a frequency of a vibration of the aircraft component;
a multiple frequency vibration absorber coupled to the aircraft component and configured to absorb the vibration, the multiple frequency vibration absorber comprising:
a beam element attached to the aircraft component;
a fluidic flexible matrix composite (FFMC) tube coupled to the beam element, wherein the FFMC tube is configured to absorb the vibration based on a stiffness of the FFMC tube;
a valve fluidically coupled to the FFMC tube, wherein the valve is to control the stiffness of the FFMC tube based on regulating a flow of a liquid through the FFMC tube; and
a controller to actively control absorption of the vibration via the FFMC tube based on actuating the valve, wherein the controller is configured to:
open the valve to decrease the stiffness of the FFMC tube based on the sensor detecting that the vibration is in a first frequency range, and
close the valve to increase the stiffness of the FFMC tube based on the sensor detecting that the vibration is in a second frequency range.

2. The aircraft of claim 1, wherein the FFMC tube is configured to change volume based on the vibration.

3. The aircraft of claim 1, further comprising:
a memory operably coupled to the controller, the memory storing a correspondence between the frequency of the vibration a position of the valve, wherein the controller sets the position of the valve based on the correspondence.

4. The aircraft of claim 1, further comprising a mass coupled to the beam element, wherein the mass is configured to tune a natural frequency of the beam element.

5. The aircraft of claim 1, wherein the valve comprises:
an orifice; and
a barrier coupled to the orifice, wherein the barrier is movable between:
a first position to completely obstruct the orifice,
a second position to completely open the orifice, and
a third position between the first position and the second position.

6. The aircraft of claim 1, wherein the valve is selected from the group consisting of: a ball valve, a plug valve, and a globe valve.

7. The aircraft of claim 1, further comprising:
a plurality of FFMC tubes comprising the FFMC tube;
a fluidic circuit fluidically coupled to the plurality of FFMC tubes, the fluidic circuit operable to carry the liquid between the plurality of FFMC tubes; and
wherein the valve is positioned between the plurality of FFMC tubes in the fluidic circuit, the valve operable to control a flow of the liquid between the plurality of FFMC tubes.

8. An aircraft component comprising:
a composite material forming an outer mold line of the aircraft component, the composite material comprising:
a plurality of layers, and
a cavity disposed within the plurality of layers;
a fluidic flexible matrix composite (FFMC) tube embedded in the cavity within the plurality of layers, wherein the FFMC tube is configured to damp a vibration of the aircraft component based on a stiffness of the FFMC tube.

9. The aircraft component of claim 8, further comprising:
an attachment mechanism coupling the composite material and the FFMC tube to one another, wherein the attachment mechanism is configured to transfer the vibration from the aircraft component to the FFMC tube;
wherein the vibration comprises an oscillatory bending of the aircraft component, and the attachment mechanism is configured to translate the oscillatory bending of the aircraft component is to an axial deformation of the FFMC tube.

10. The aircraft component of claim 9, wherein the FFMC tube is configured to change volume based on the axial deformation.

11. The aircraft component of claim 8, further comprising:
a plurality of fluidic flexible matrix composite (FFMC) tubes, the FFMC tubes comprising the FFMC tube;
a fluidic circuit fluidically coupled to the plurality of FFMC tubes, the fluidic circuit operable to carry a capacity of a liquid between the plurality of FFMC tubes; and
a valve positioned between the plurality of FFMC tubes in the fluidic circuit, wherein the valve is to control the stiffness of the plurality of FFMC tubes based on regulating a flow of a liquid through the FFMC tube.

12. The aircraft component of claim 11, wherein the valve comprises:
an orifice; and
a barrier coupled to the orifice, wherein the barrier is movable between:
a first position to completely obstruct the orifice,
a second position to completely open the orifice, and
a third position between the first position and the second position.

13. The aircraft component of claim 12, wherein the valve is selected from the group consisting of: a ball valve, a plug valve, and a globe valve.

14. The aircraft component of claim 8, further comprising:
an axis about which the aircraft component bends based on the vibration, wherein the FFMC tube is offset from the axis.

15. A vibration damping system comprising:
an aerodynamic aircraft member comprising an outer surface, wherein a cross section of the aerodynamic aircraft member comprises quadrants; and
fluidic flexible matrix composite (FFMC) tubes coupled to the outer surface and configured to damp a torsional vibration of the aerodynamic aircraft member based on the FFMC tubes being fluidically coupled to one another and positioned in different ones of the quadrants that are located diagonal to one another;

wherein the valve is selected from the group consisting of a ball valve, a plug valve, and a globe valve.

16. The vibration damping system of claim 15, wherein each of the FFMC tubes is configured to receive an axial deformation based on the torsional vibration.

17. The vibration damping system of claim 15, wherein the FFMC tubes comprise:
- a first FFMC tube located in a first of the quadrants; and
- a second FFMC tube located in a second of the quadrants that is at a diagonal position relative to the first of the quadrants, wherein the first FFMC tube and the second FFMC tube are fluidically coupled to one another and are fluidically decoupled from ones of the FFMC tubes in adjacent ones of the quadrants.

18. The vibration damping system of claim 17, wherein:
- the first FFMC tube is configured to receive a tensile axial strain based on the torsional vibration, and
- the second FFMC tube is configured to receive a compressive axial strain based on the torsional vibration.

19. The vibration damping system of claim 15, further comprising:
- a valve fluidically coupled to the FFMC tubes, wherein the valve is to control a stiffness of the FFMC tubes based on regulating a flow of a liquid between the FFMC tubes.

* * * * *

UNITED STATES PATENT AND TRADEMARK OFFICE
CERTIFICATE OF CORRECTION

| | |
|---|---|
| PATENT NO. | : 11,719,301 B2 |
| APPLICATION NO. | : 16/399458 |
| DATED | : August 8, 2023 |
| INVENTOR(S) | : Romano et al. |

It is certified that error appears in the above-identified patent and that said Letters Patent is hereby corrected as shown below:

In the Claims

In Column 23, Claim 3, Line 46, replace "vibration a position of the valve" with --vibration and a position of the valve--.

In Column 24, Claim 9, Line 25, replace "component is to an axial deformation" with --component to an axial deformation of the FFMC tube--.

Signed and Sealed this
Twelfth Day of September, 2023

Katherine Kelly Vidal
*Director of the United States Patent and Trademark Office*